(12) United States Patent
Chen et al.

(10) Patent No.: US 9,661,337 B2
(45) Date of Patent: May 23, 2017

(54) IMAGE INTRA PREDICTION METHOD AND APPARATUS

(75) Inventors: Jianle Chen, Suwon-si (KR); Vadim Seregin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1088 days.

(21) Appl. No.: 13/877,181

(22) PCT Filed: Sep. 30, 2011

(86) PCT No.: PCT/KR2011/007280
§ 371 (c)(1),
(2), (4) Date: Apr. 1, 2013

(87) PCT Pub. No.: WO2012/044126
PCT Pub. Date: Apr. 5, 2012

(65) Prior Publication Data
US 2013/0182761 A1    Jul. 18, 2013

Related U.S. Application Data

(60) Provisional application No. 61/388,759, filed on Oct. 1, 2010.

(51) Int. Cl.
*H04N 19/186* (2014.01)
*H04N 9/825* (2006.01)
(Continued)

(52) U.S. Cl.
CPC ........... *H04N 19/186* (2014.11); *H04N 9/825* (2013.01); *H04N 19/176* (2014.11); *H04N 19/42* (2014.11);
(Continued)

(58) Field of Classification Search
CPC ...... H04N 9/873; H04N 9/825; H04N 19/186; H04N 19/593; H04N 19/176
See application file for complete search history.

(56) References Cited

U.S. PATENT DOCUMENTS 8,135,235 B2    3/2012   Kang et al.
2002/0172418 A1  11/2002  Hu
(Continued)

FOREIGN PATENT DOCUMENTS

KR   10-2007-0077609 A    7/2007
KR   10-2009-0112131 A   10/2009
(Continued)

OTHER PUBLICATIONS

Communication issued May 30, 2014, by the Australian Patent Office; in corresponding Australian Patent Application No. 2011308105.
(Continued)

*Primary Examiner* — David N Werner
(74) *Attorney, Agent, or Firm* — Sughrue Mion, PLLC

(57) ABSTRACT

An apparatus and method for intra-predicting an image are provided. The method includes: obtaining, based on restored neighboring pixels of a chrominance block and restored neighboring pixels of a luminance pixel corresponding to the chrominance block, parameters representing a correlation between the chrominance block that is to be intra-predicted and a luminance block; and predicting, using the parameters, the chrominance block from the luminance block, wherein the obtaining the parameters includes performing a predetermined operation on the restored neighboring pixels of the chrominance block and the restored neighboring pixels of the luminance block, and wherein the predetermined operation comprises an adaptive scaling process of changing bit
(Continued)

depths of the parameters to reduce a size of a look-up table and prevent an occurrence of overflow.

17 Claims, 17 Drawing Sheets

(51) Int. Cl.
*H04N 19/176* (2014.01)
*H04N 19/593* (2014.01)
*H04N 19/42* (2014.01)
*H04N 9/873* (2006.01)
*H04N 11/06* (2006.01)
*H04N 11/24* (2006.01)
*H04N 11/00* (2006.01)

(52) U.S. Cl.
CPC ........... *H04N 19/593* (2014.11); *H04N 9/873* (2013.01); *H04N 11/00* (2013.01); *H04N 11/002* (2013.01); *H04N 11/004* (2013.01); *H04N 11/006* (2013.01); *H04N 11/06* (2013.01)

(56) References Cited

U.S. PATENT DOCUMENTS

| | | | |
|---|---|---|---|
| 2003/0169931 A1 | 9/2003 | Lainema | |
| 2004/0062445 A1* | 4/2004 | Kim | G06T 9/004 382/238 |
| 2005/0013375 A1 | 1/2005 | Dattani et al. | |
| 2005/0053295 A1* | 3/2005 | Holcomb | H04N 19/70 382/236 |
| 2006/0233251 A1* | 10/2006 | Kim | H04N 19/139 375/240.12 |
| 2006/0291565 A1* | 12/2006 | Chen | H04N 19/176 375/240.24 |
| 2009/0268963 A1 | 10/2009 | Kang et al. | |
| 2011/0243225 A1* | 10/2011 | Min | H04N 19/44 375/240.12 |
| 2011/0255591 A1* | 10/2011 | Kim | H04N 19/107 375/240.02 |
| 2012/0201311 A1* | 8/2012 | Sole | H04N 19/176 375/240.29 |
| 2016/0309184 A1* | 10/2016 | Choe | H04N 19/117 |

FOREIGN PATENT DOCUMENTS

| | | |
|---|---|---|
| KR | 10-2010-0095914 A | 9/2010 |
| RU | 2302707 C2 | 7/2007 |
| WO | 2004061774 A1 | 7/2004 |

OTHER PUBLICATIONS

Communication, dated Jan. 28, 2014, issued by the Japanese Patent Office in counterpart Japanese Application No. 2013-531502.
Kim, Jungsun et al. "New Intra Chroma Prediction Using Inter-Channel Correlation," Joint Collaborative Team on Video Coding (JCT-VC) of ITU-T SG16 WP3 and ISO/IEC JTC1/SC29/WG11, Jul. 21-28, 2010, pp. 1-11.
International Search Report dated Apr. 4, 2012 issued in International Application No. PCT/KR2011/007280 (PCT/ISA/210).
Written Opinion dated Apr. 4, 2012 issued in International Application No. PCT/KR2011/007280 (PCT/ISA/237).
Communication dated Sep. 12, 2014, issued by the European Patent Office in counterpart European Application No. 11829632.6.
Communication dated Oct. 23, 2014, issued by the Russian Patent Office in counterpart Russian Application No. 2013120307/08.
Sang Heon Lee et al., "A new intra prediction method using channel correlations for the H.264/AVC intra coding ÃÂ", Picture Coding Symposium 2009, May 6, 2009 (May 6, 2009), 4 pages total, XP030081904.
Sang Heon Lee et al., "Intra prediction method based on the linear relationship between the channels for YUV 4â 2â intra coding", Image Processing (ICIP), 2009 16TH IEEE International Conference on, Nov. 7, 2009 (Nov. 7, 2009), p. 1037-1040, XP031628426.
Chen J et al., "Chrome intra prediction by scaled luma samples using integer operations", 3. JCT-VC Meeting, 94. MPEG Meeting, Jul. 10, 2010-Oct. 15, 2010, Guangzhou, (Joint Collaborative Team on Video Coding of ISO/IEC JTC1/SC29/WG11 and ITU-T SG.16), http://wftp3.itu.int/avarch/jctvc-site/, Oct. 2, 2010 (Oct. 2, 2010), 7 pages total, XP030007913.

* cited by examiner

FIG. 7
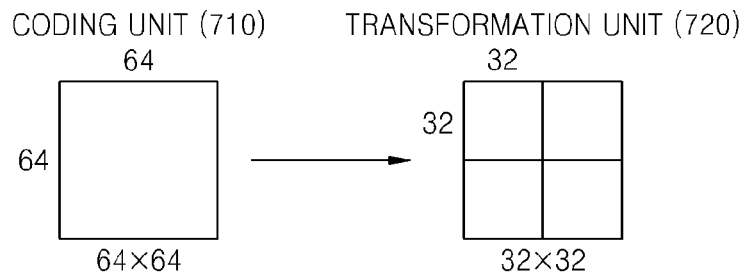
FIG. 8
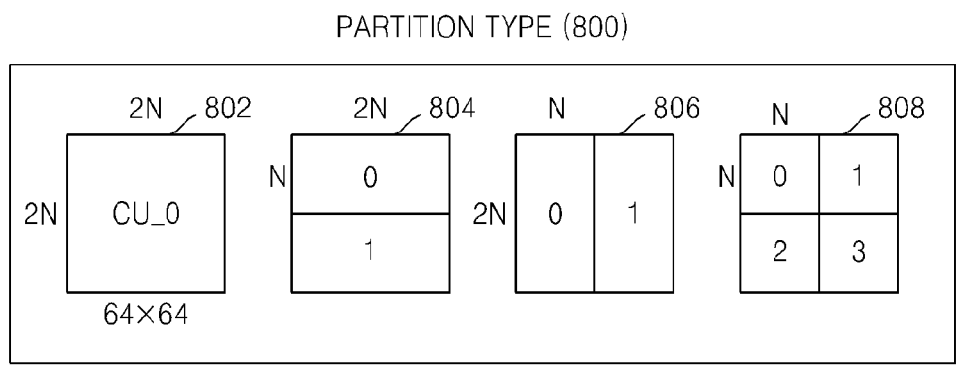
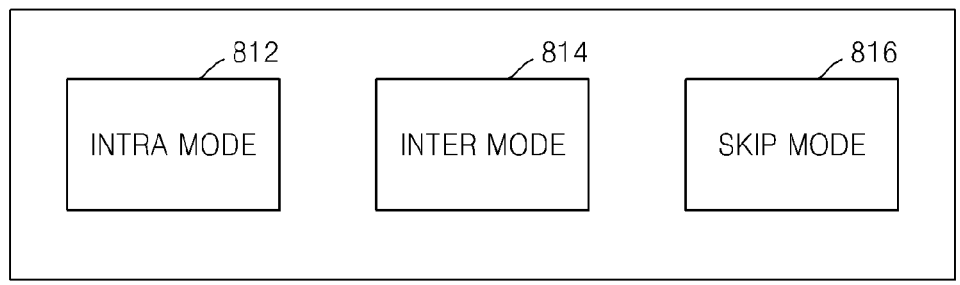
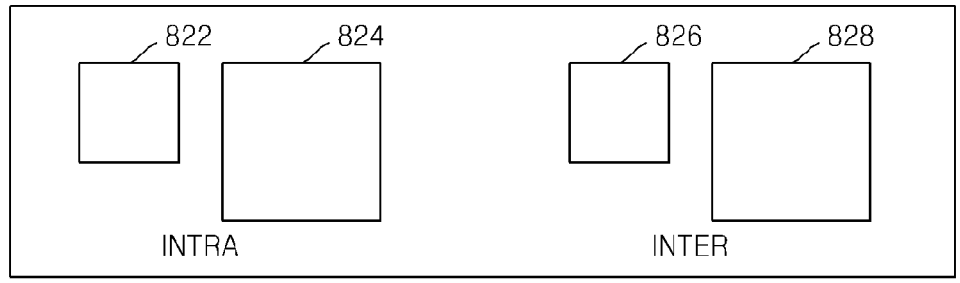

CODING UNIT (1010)

PREDICTION UNIT (1060)

4:2:0 FORMAT

4:2:2 FORMAT

4:4:4 FORMAT

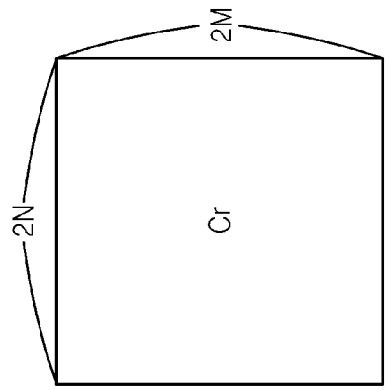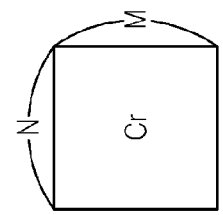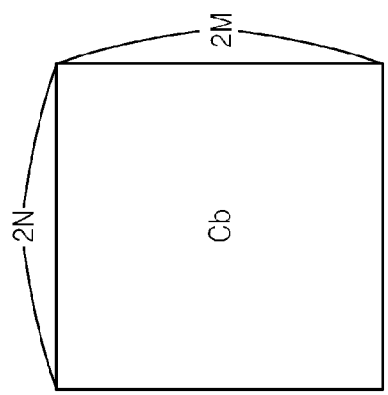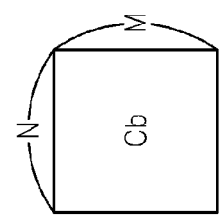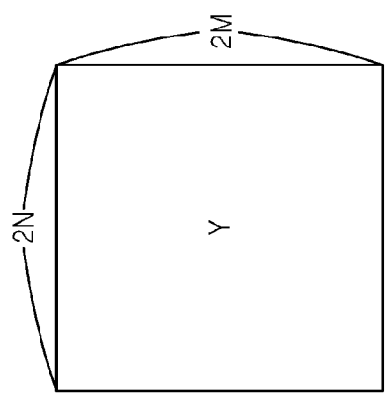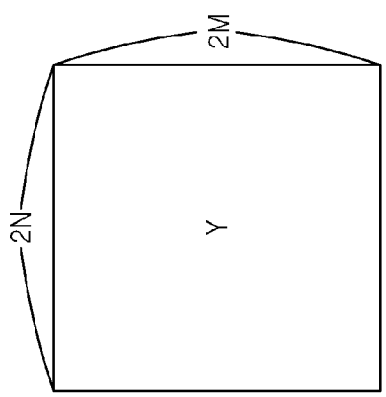
FIG. 16A
FIG. 16B

| $[A_2 >> r_{A2}]$ | $\dfrac{2^{n_{table}}}{[A_2 >> r_{A2}]}$ |
|---|---|
| 000000 | xxx |
| 000001 | xxx |
| ⋮ | ⋮ |
| 111111 | xxx |

64

IMAGE INTRA PREDICTION METHOD AND APPARATUS

CROSS-REFERENCE TO RELATED APPLICATIONS

This application is a National Stage application under 35 U.S.C. §371 of International Application No. PCT/KR2011/007280, filed on Sep. 30, 2011, and claims the benefit of U.S. Provisional Application No. 61/388,759, filed on Oct. 1, 2010 in the United States Patent and Trademark Office, the disclosures of which are incorporated herein by reference in their entireties.

BACKGROUND

1. Field

One or more apparatuses and methods consistent with exemplary embodiments relate to encoding and decoding an image, and more particularly, to predicting a chrominance signal from a previously restored luminance signal, based on a correlation between the chrominance signal and the previously restored luminance signal.

2. Description of the Related Art

In an image encoding method such as MPEG-1, MPEG-2, MPEG-4 H.264/MPEG-4 Advanced Video Coding (AVC), or the like, an image is divided into blocks each having a predetermined size to encode the image. Then, each of the blocks is prediction-encoded by using inter prediction or intra prediction.

A prediction block generated by performing inter prediction or intra prediction is subtracted from the original block to produce a residual block, and the residual block undergoes discrete cosine transformation, quantization, and entropy encoding to produce a bitstream.

In a related art image encoding method or decoding method, a single pixel is represented with a luminance component and a chrominance component, and the luminance component and the chrominance component are independently encoded or decoded.

SUMMARY

One or more exemplary embodiments provide a method and apparatus for predicting a chrominance signal from a luminance signal, based on a correlation between the chrominance signal and the luminance signal.

One or more exemplary embodiments also provide a prediction method and apparatus for preventing a bit overflow from occurring while the precision of data is maintained.

According to an aspect of an exemplary embodiment, parameters representing a correlation between a restored chrominance signal and a restored luminance signal are obtained, and a chrominance signal is predicted from the restored luminance signal by using the parameters. The parameters may be obtained by performing a predetermined operation. The predetermined operation may include an adaptive scaling process of changing bit depths of the parameters to reduce the size of a lookup table and prevent an overflow from occurring.

According to an aspect of an exemplary embodiment, there is provided a method of intra-predicting an image, the method including: obtaining parameters representing a correlation between a chrominance block that is to be intra-predicted and a luminance block, based on restored neighboring pixels of the chrominance block and restored neighboring pixels of a luminance pixel corresponding to the chrominance block; and predicting the chrominance block from the luminance block by using the parameters.

The obtaining the parameters includes obtaining the parameters by performing a predetermined operation on the restored neighboring pixels of the chrominance block and the restored neighboring pixels of the luminance block.

The predetermined operation includes an adaptive scaling process of changing bit depths of the parameters to reduce the size of a look-up table and prevent occurrence of overflow.

According to an aspect of another exemplary embodiment, there is provided an apparatus for intra-predicting an image, the apparatus including: a parameter obtainer which obtains parameters representing a correlation between a chrominance block that is to be intra-predicted and a luminance block, based on restored neighboring pixels of the chrominance block and restored neighboring pixels of a luminance pixel corresponding to the chrominance block; and a prediction performer which predicts the chrominance block from the luminance block by using the parameters.

The parameter obtainer obtains the parameters by performing a predetermined operation on the restored neighboring pixels of the chrominance block and the restored neighboring pixels of the luminance block.

The parameter obtainer further performs an adaptive scaling process of changing bit depths of the parameters to reduce the size of a look-up table and prevent occurrence of overflow.

According to an exemplary embodiment, the efficiency of prediction may be improved based on a correlation between a luminance signal and a chrominance signal.

Also, a linear correlation between parameters defining a luminance signal and a chrominance signal may be obtained without having to perform a division operation, thereby reducing an amount of calculation for prediction and increasing a speed of the calculation.

Also, it is possible to prevent a bit overflow from occurring during the obtaining of the parameters while maintaining the precision of data.

DESCRIPTION OF THE DRAWINGS

FIG. 7 is a diagram for describing a relationship between a coding unit and transformation units, according to an exemplary embodiment;

FIG. 8 is a diagram for describing encoding information of coding units corresponding to a coded depth, according to an exemplary embodiment;

FIGS. 16A and 16B are reference diagrams each illustrating a luminance block and a chrominance block according to a color format;

DETAILED DESCRIPTION OF EXEMPLARY EMBODIMENTS

One or more exemplary embodiments will now be described more fully with reference to the accompanying drawings.

Figure 1:
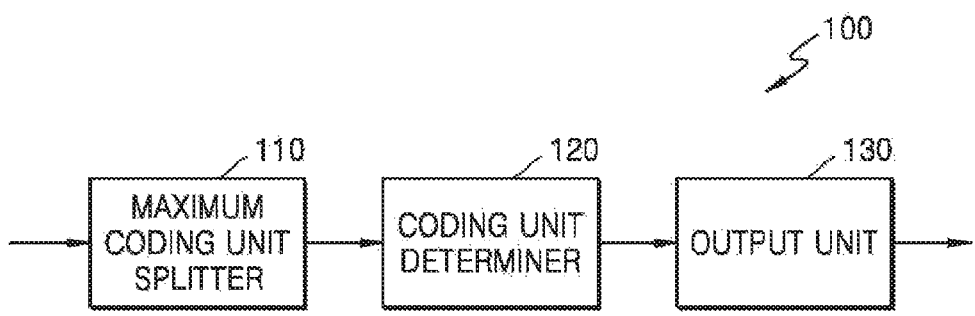
FIG. 1 is a block diagram of a video encoding apparatus according to an exemplary embodiment.

FIG. 1 is a block diagram of a video encoding apparatus 100 according to an exemplary embodiment.

The video encoding apparatus 100 includes a maximum coding unit splitter 110, a coding unit determiner 120, and an output unit 130 (e.g., an outputter).

The maximum coding unit splitter 110 may split a current picture based on a maximum coding unit for the current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and length in power of 2 that are greater than 8. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit, and as the depth deepens, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a coded depth by encoding the image data in the deeper coding units according to depths, according to the maximum coding unit of the current picture, and selecting a depth having the least encoding error. Thus, the encoded image data of the coding unit corresponding to the determined coded depth is finally output. Also, the coding units corresponding to the coded depth may be regarded as encoded coding units.

The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to same depth in one maximum coding unit, it is determined whether to split each of the coding units corresponding to the same depth to a lower depth by measuring an encoding error of the image data of the each coding unit, separately. Accordingly, even when image data is included in one maximum coding unit, the image data is split to regions according to the depths and the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of splitting times from a maximum coding unit to a minimum coding unit. A first maximum depth according to an exemplary embodiment may denote the total number of splitting times from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit.

In order to perform the transformation in the coding unit, the transformation may be performed based on a data unit having a size smaller than or equal to the coding unit. For example, the data unit for transformation may include a data unit for an intra mode and a data unit for an inter mode.

The data unit for transformation may be hereinafter referred to as a transformation unit. Similarly to the coding unit, the transformation unit in the coding unit may be recursively split into smaller sized regions, and thus residual data in the coding unit may be divided according to the transformation having the tree structure according to transformation depths.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is also 2N×2N, may be 1 when each of the height and width of the current coding unit is split into two equal parts, totally split into 4 transformation units, and the size of the transformation unit is thus N×N, and may be 2 when each of the height and width of the current coding unit is split into four equal parts, totally split into 4$^2$ transformation units and the size of the transformation unit is thus N/2×N/2. For example, the transformation unit may be set according to a hierarchical tree structure, in which a transformation unit of an upper transformation depth is split into four transformation units of a lower transformation depth according to the hierarchical characteristics of a transformation depth.

Similarly to the coding unit, the transformation unit in the coding unit may be recursively split into smaller sized regions, so that the transformation unit may be determined independently in units of regions. Thus, residual data in the coding unit may be divided according to the transformation having the tree structure according to transformation depths.

Encoding information according to coding units corresponding to a coded depth requires not only information about the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units according to a tree structure in a maximum coding unit and a method of determining a partition, according to exemplary embodiments, will be described in detail later with reference to FIGS. 3 and 12.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit constituting the lowermost depth by 4. Alternatively, the minimum unit may be a maximum rectangular data unit that may be included in all of the coding units, prediction units, and transformation units included in the maximum coding unit.

For example, the encoding information output through the output unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or GOPs, and information about a maximum depth may be inserted into a header of a bitstream.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include maximum 4 of the coding unit of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Accordingly, when an image having a very high resolution or a large amount of data is encoded in units of existing macroblocks, the number of macroblocks for each pixel excessively increases. Thus, the amount of compression information generated for each macroblock also increases, and accordingly, the load of transmitting the compression information tends to increase and data compression efficiency tends to decrease. Accordingly, the video encoding apparatus 100 may increase a maximum size of a coding unit in consideration of the size of the image and adjust a coding unit in consideration of image characteristics, whereby image compression efficiency may increase.

Figure 2:
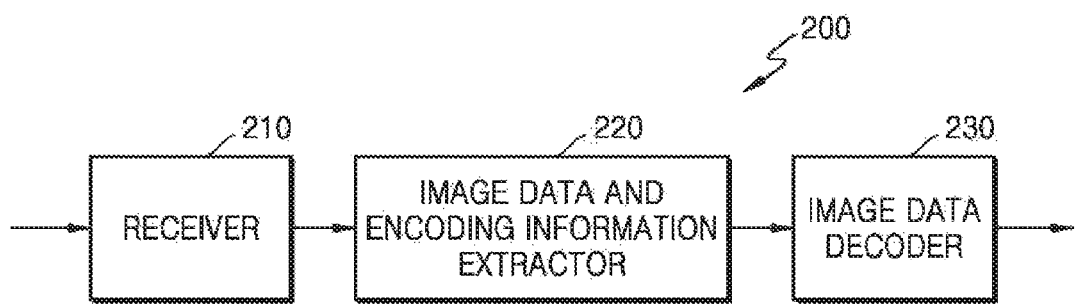
FIG. 2 is a block diagram of a video decoding apparatus according to an exemplary embodiment.

FIG. 2 is a block diagram of a video decoding apparatus 200 according to an exemplary embodiment.

The video decoding apparatus 200 according to an exemplary embodiment includes a receiver 210, an image data and encoding information extractor 220, and an image data decoder 230. Definitions of various terms, such as a coding unit, a depth, a prediction unit, a transformation unit, and information about various encoding modes, for various operations of the video decoding apparatus 200 are identical to those described with reference to FIG. 1 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture or SPS.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, split information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may perform inverse transformation based on a transformation unit in units of a coding unit, based on the information about the size of the transformation unit of the coding unit according to coded depths, so as to perform the inverse transformation according to maximum coding units.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to the each coded depth in the current maximum coding unit by using the information about the partition type of the prediction unit, the prediction mode, and the size of the transformation unit for each coding unit corresponding to the coded depth, and output the image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode.

The video decoding apparatus 200 may obtain encoding information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded.

Accordingly, the video decoding apparatus 200 may efficiently decode even image data corresponding to an image having a high resolution or an excessively large amount of data according to the size and encoding mode of a coding unit adaptively determined according to the characteristics of the image, by using information about the optimal encoding mode received from the encoder.

A method of determining coding units having a tree structure, a prediction unit, and a transformation unit, according to an exemplary embodiment, will now be described with reference to FIGS. 3 through 13.

Figure 3:
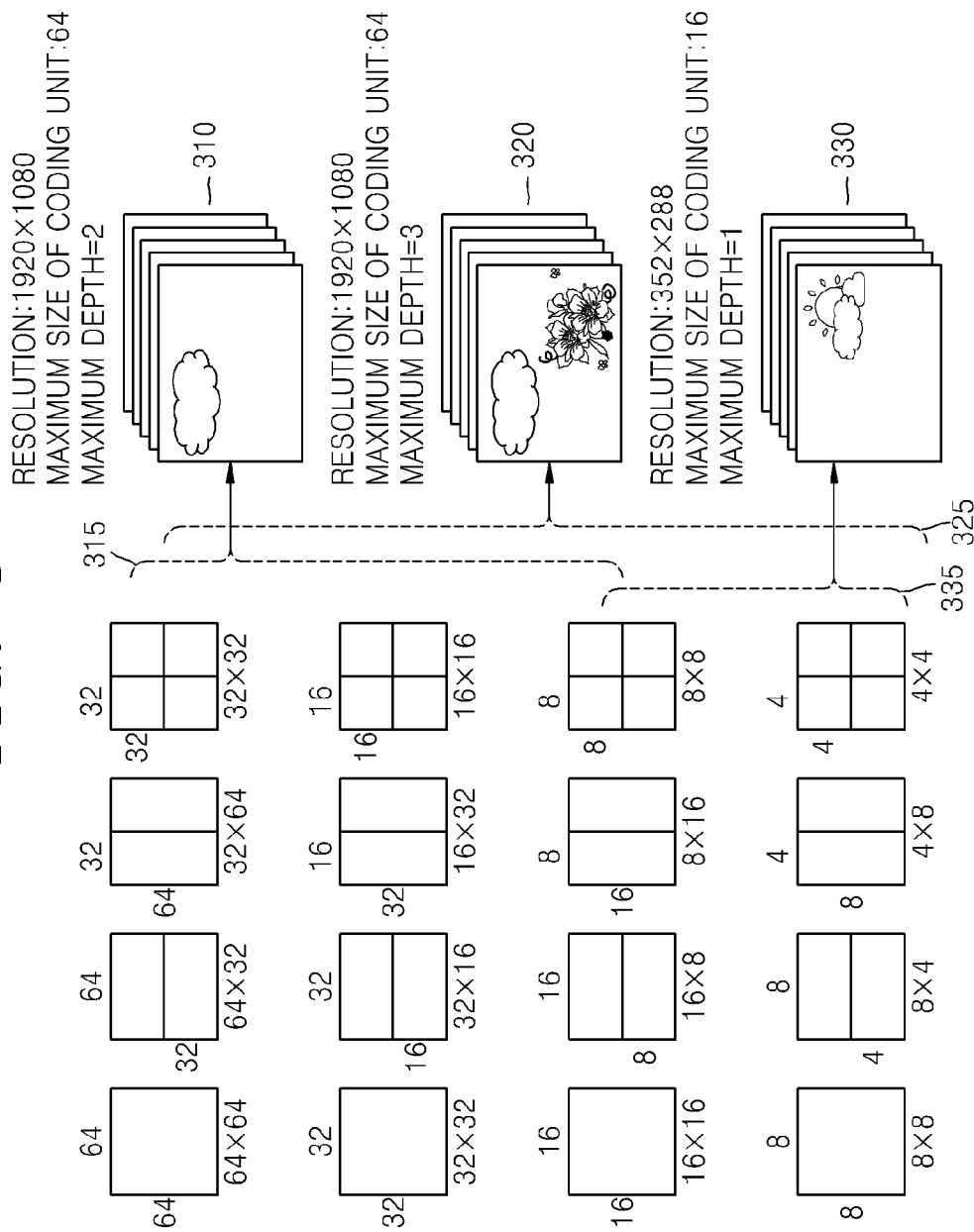
FIG. 3 is a diagram for describing a concept of coding units according to an exemplary embodiment.

FIG. 3 is a diagram for describing a concept of hierarchical coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth of FIG. 3 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the vide data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 4:
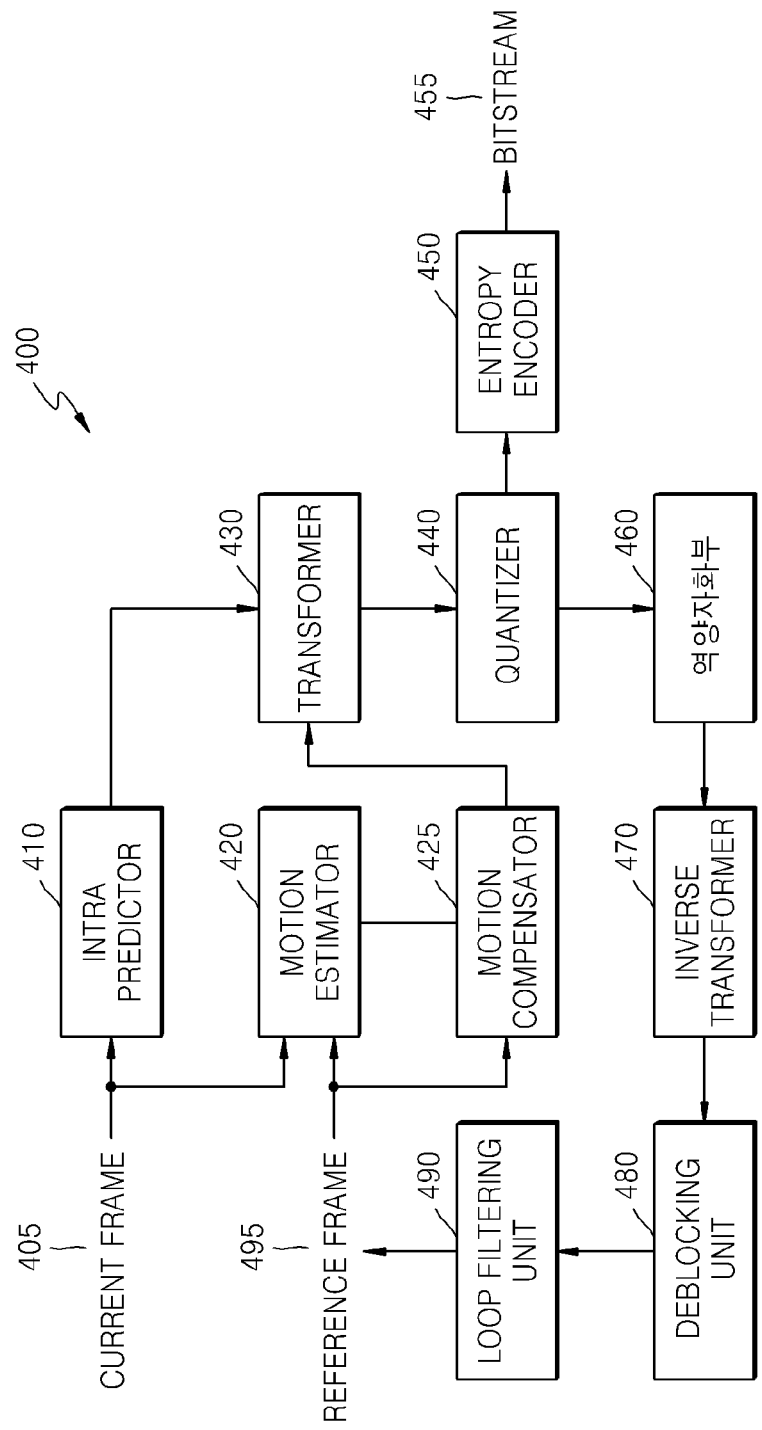
FIG. 4 is a block diagram of an image encoder based on coding units, according to an exemplary embodiment.

FIG. 4 is a block diagram of an image encoder 400 based on coding units, according to an exemplary embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 performs inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit from among coding units having a tree structure while considering the maximum depth of each maximum coding unit.

Specifically, the intra predictor 410, the motion estimator 420, and the motion compensator 425 determines partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Figure 5:
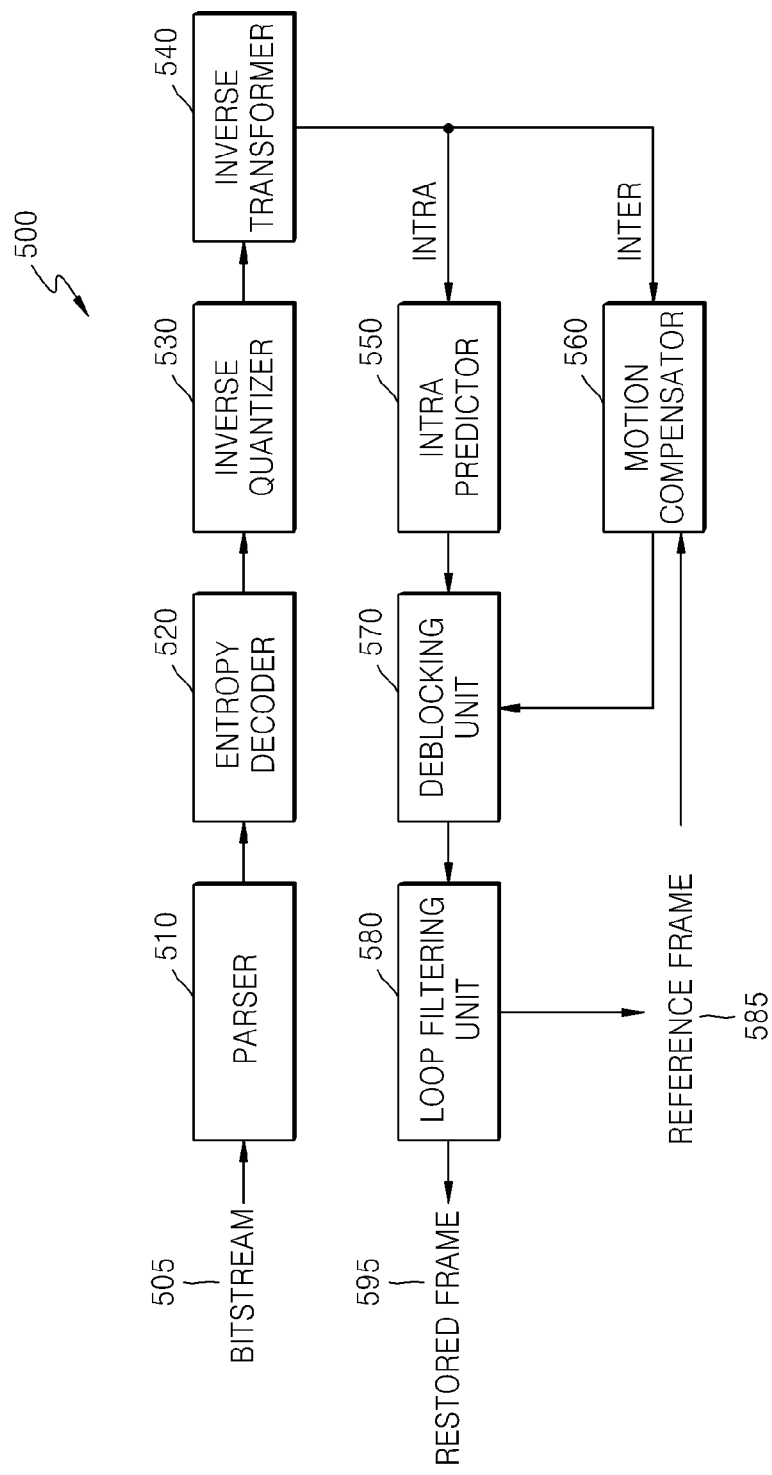
FIG. 5 is a block diagram of an image decoder based on coding units, according to an exemplary embodiment.

FIG. 5 is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

In order to decode the image data in the image data decoder 230 of the video decoding apparatus 200, the image decoder 500 may perform operations that are performed after the parser 510.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform operations based on coding units having a tree structure for each maximum coding unit.

Specifically, the intra prediction 550 and the motion compensator 560 perform operations based on partitions and a prediction mode for each of the coding units having a tree structure, and the inverse transformer 540 perform operations based on a size of a transformation unit for each coding unit.

Figure 6:
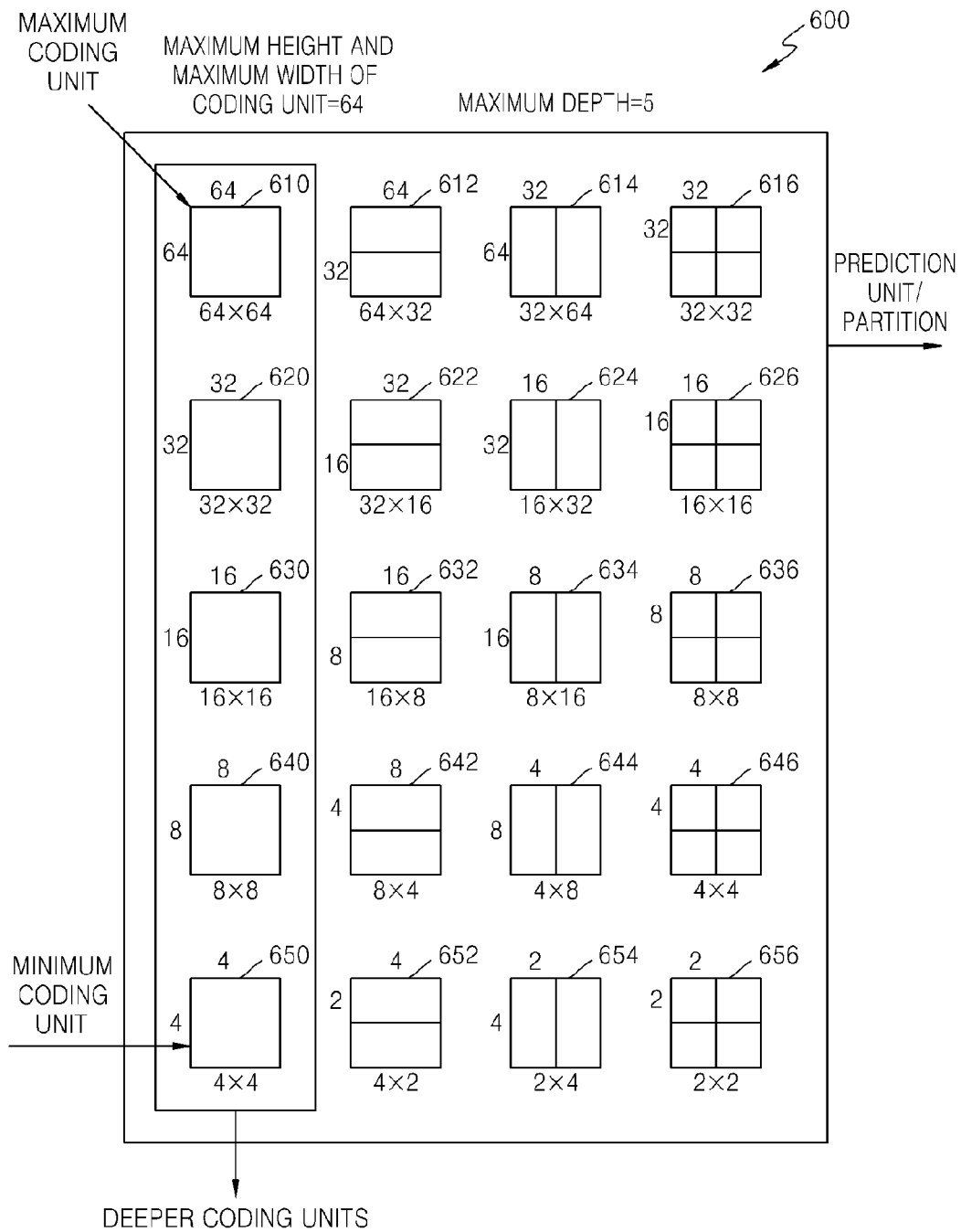
FIG. 6 is a diagram illustrating deeper coding units according to depths, and partitions, according to an exemplary embodiment.

FIG. 6 is a diagram illustrating deeper coding units according to depths, and partitions, according to an exemplary embodiment.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions include in the encoding unit 610, i.e., a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e., a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e., a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e., a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the minimum coding unit and a coding unit of the lowermost depth. A prediction unit of the coding unit 650 is only assigned to a partition having a size of 4×4.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size, increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

FIG. 7 is a diagram for describing a relationship between a coding unit 710 and transformation units 720, according to an exemplary embodiment.

The video encoding apparatus 100 or 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

FIG. 8 is a diagram for describing encoding information of coding units corresponding to a coded depth, according to an exemplary embodiment.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second intra transformation unit 828.

The image data and encoding information extractor 220 of the video decoding apparatus 200 may extract and use the information 800, 810, and 820 for decoding, according to each deeper coding unit.

Figure 9:
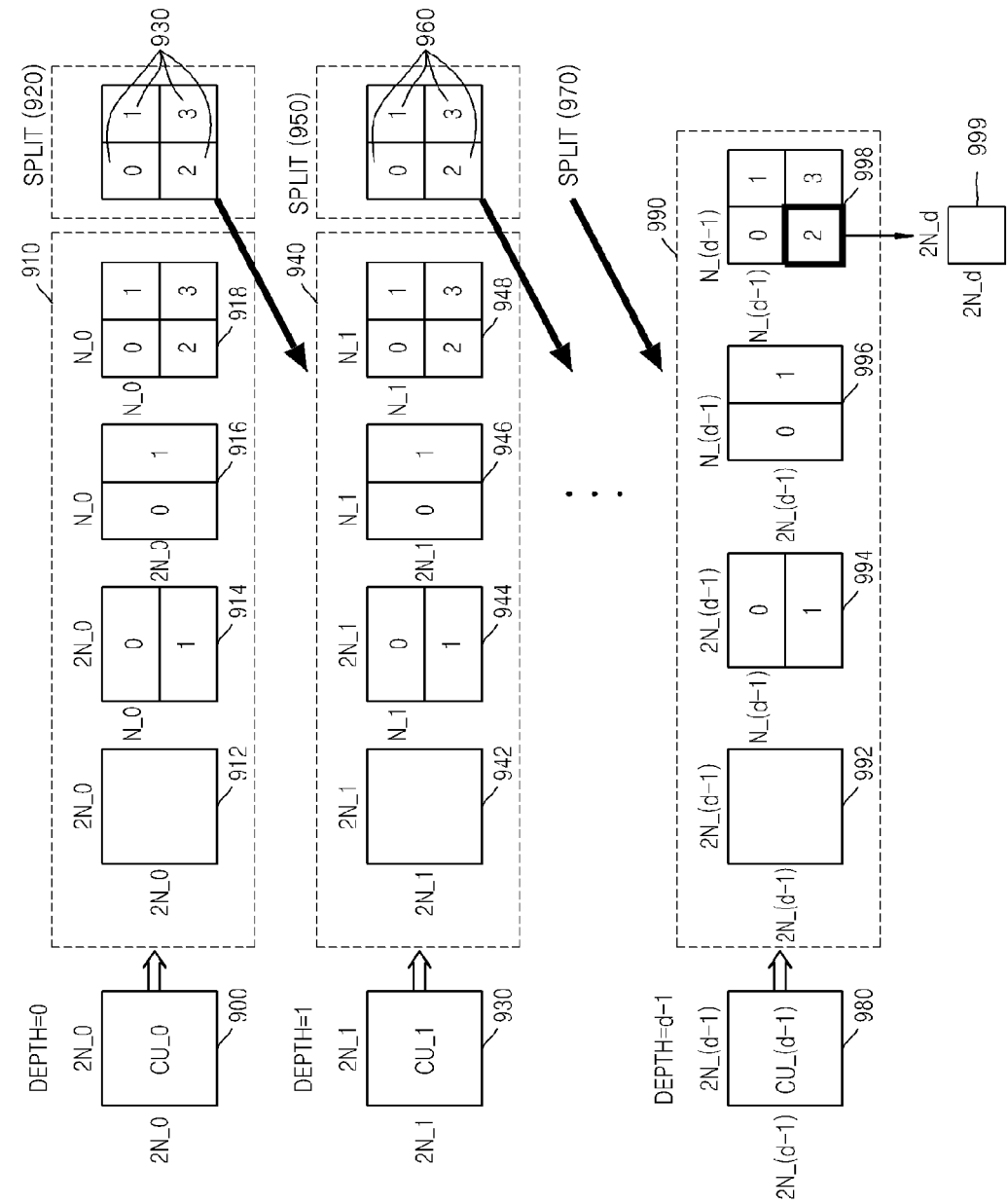
FIG. 9 is a diagram of deeper coding units according to depths, according to an exemplary embodiment.

FIG. 9 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0,a partition type 914 having a size of 2N_0×N_0,a partition type 916 having a size of N_0×2N_0,and a partition type 918 having a size of N_0×N_0. FIG. 16 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0,two partitions having a size of 2N_0×N_0,two partitions having a size of N_0×2N_0,and four partitions having a size of N_0×N_0,according to each partition type. The prediction encoding in an intra mode and an inter mode may be performed on the partitions having the sizes of 2N_0×2N_0,N_0×2N_0, 2N_0×N_0,and N_0×N_0. The prediction encoding in a skip mode is performed only on the partition having the size of 2N_0×2N_0.

Errors of encoding including the prediction encoding in the partition types 912 through 918 are compared, and the least encoding error is determined among the partition types. If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1,a partition type 944 having a size of 2N_1×N_1,a partition type 946 having a size of N_1×2N_1,and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an exemplary embodiment may be a rectangular data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 10:
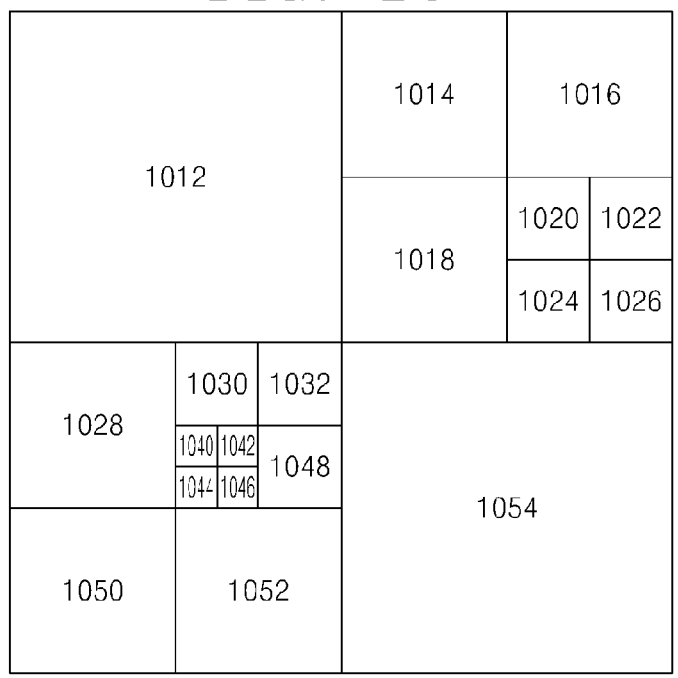
FIGS. 10, 11, and 12 are diagrams for describing a relationship between coding units, prediction units, and transformation units, according to an exemplary embodiment.
Figure 11:
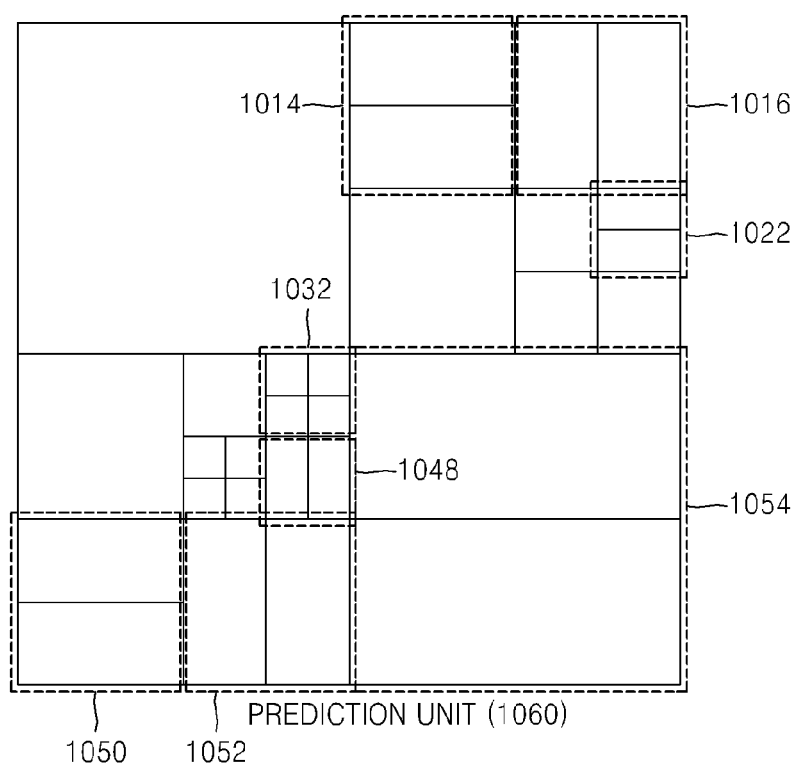
Figure 12:
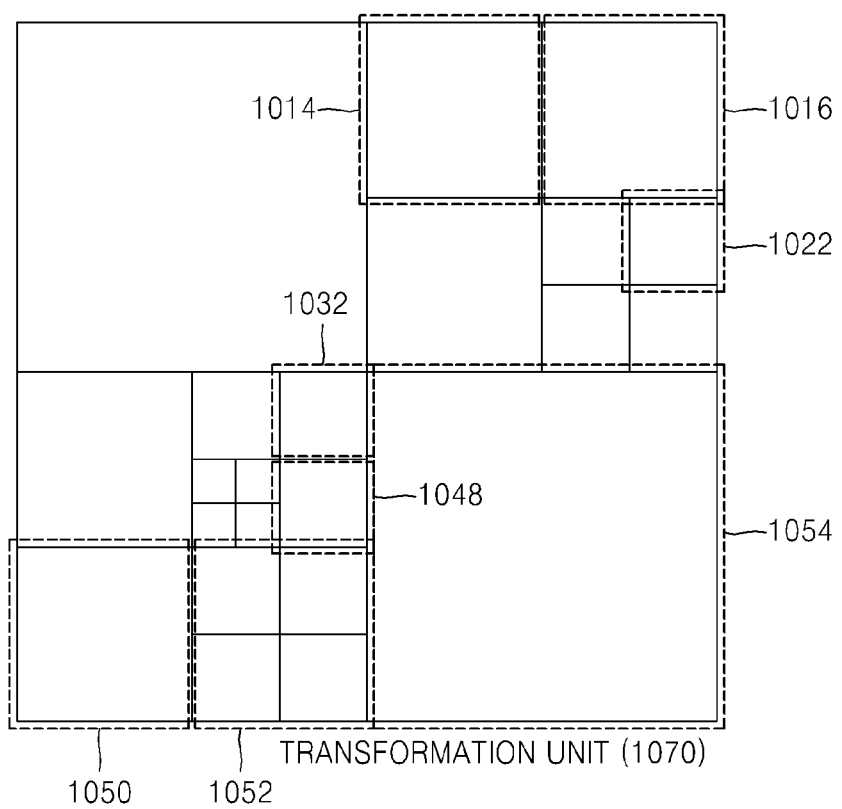

FIGS. 10, 11, and 12 are diagrams for describing a relationship between coding units 1010, prediction units 1060, and transformation units 1070, according to an exemplary embodiment.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

TABLE 1

Split Information 0
(Encoding on Coding Unit having Size of 2Nx2N and Current Depth of d)

| Prediction Mode | Partition Type | | Size of Transformation Unit | | Split Information 1 |
|---|---|---|---|---|---|
| Intra Inter | Symmetrical Partition Type | Asymmetrical Partition Type | Split Information 0 of Transformation Unit | Split Information 1 of Transformation Unit | Repeatedly Encode |
| Skip (Only 2Nx2N) | 2Nx2N 2NxN Nx2N NxN | 2NxnU 2NxnD nLx2N nRx2N | 2Nx2N | NxN (Symmetrical Type) N/2xN/2 (Asymmetrical Type) | Coding Units having Lower Depth of d + 1 |

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1.

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 13:
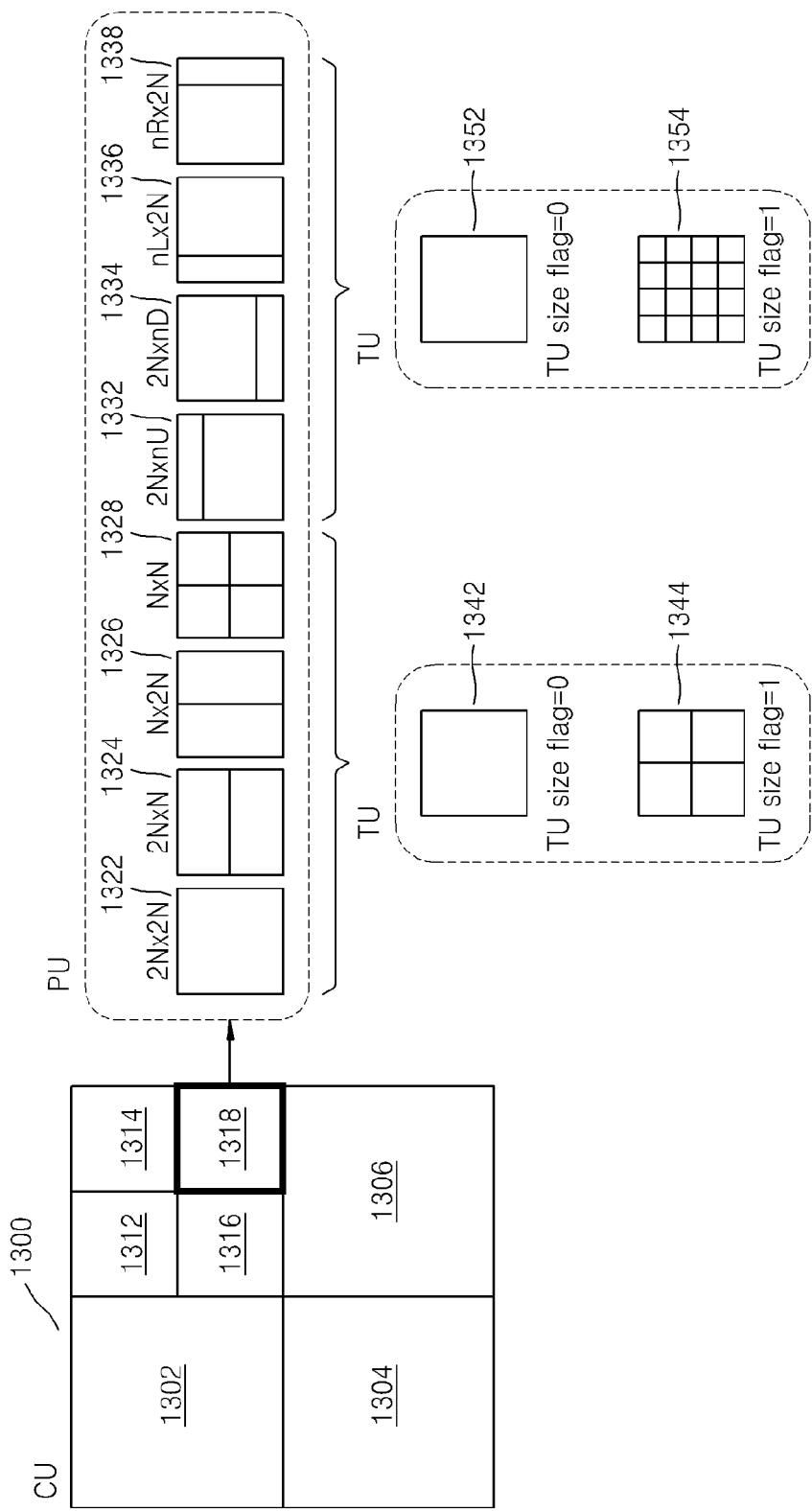
FIG. 13 is a diagram for describing a relationship between a coding unit, a prediction unit or a partition, and a transformation unit, according to encoding mode information of Table 1.

FIG. 13 is a diagram for describing a relationship between a coding unit, a prediction unit or a partition, and a transformation unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e., the partition type 1322, 1324, 1326, or 1328, a transformation unit 1342 having a size of 2N×2N is set if the TU size flag of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

A prediction process performed in the encoding apparatus 400 of FIG. 4 and the prediction process performed in the decoding apparatus 400 of FIG. 5 will now be described in detail. A prediction process according to an exemplary embodiment may be performed as a new intra prediction mode by the intra predictor 410 of FIG. 4 and the intra predictor 550 of FIG. 5. Hereinafter, the prediction unit is referred to as a block.

In general, at least three color components are needed for each pixel to display colors in a color video signal. There are various examples of a color space, such as an RGB color space in which each of samples of a color video signal is represented using three pixel values that each represent a relative ratio between red (R), green (G), and blue (B); and a YCbCr color space and a YUV color space, in which a color video signal is represented using luminance and chrominance components based on a fact that a human visual system (HVS) is more sensitive to luminance component. Generally, in video encoding/decoding methods, encoding and decoding are performed by dividing a video signal into such a plurality of color components. It is highly probable that a predetermined correlation is present between color components of the same pixel in the video signal containing such a plurality of color components. For example, the values of a luminance component Y and chrominance components Cb and Cr of corresponding pixels belonging to the same block may exhibit a similar pattern.

Thus, an intra prediction apparatus according to an exemplary embodiment obtains parameters representing a linear correlation between a luminance signal and a chrominance signal, based on restored neighboring luminance pixels and restored neighboring chrominance pixels before a current chrominance block is processed, and then produces a predicted value of the current chrominance block from a previously restored luminance block by using the parameters. In particular, according to an exemplary embodiment, it is possible to efficiently obtain parameters representing a linear correlation between a luminance signal and a chrominance signal by performing shift, multiplication, addition, and subtraction operations and accessing a look-up table, without having to perform a division operation that increases hardware load on the system. Also, according to an exemplary embodiment, values needed to perform an operation for obtaining parameters may be previously stored in a look-up table, and the parameters may be obtained based on the look-up table, thereby reducing an amount of calculation. Hereinafter, exemplary embodiments will be described with respect to a process of predicting a pixel of a chrominance component from a pixel of a corresponding luminance component. However, it will be obvious to those of ordinary skill in the art that one or more other exemplary embodiments are not limited to the YCbCr color space and may be applied to other various color spaces, e.g., the RGB color space.

Figure 14:
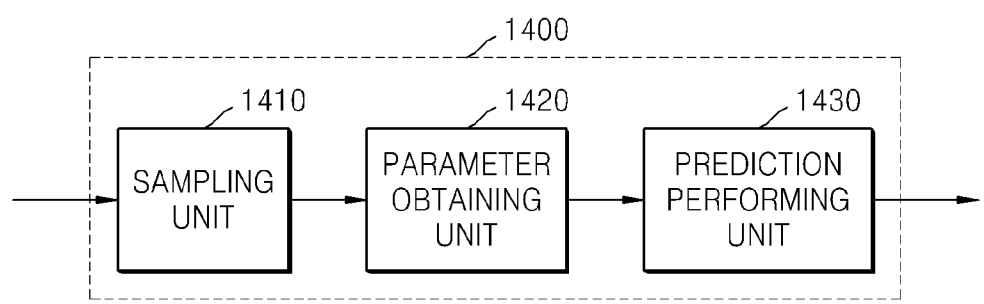
FIG. 14 is a block diagram of an intra prediction apparatus according to an exemplary embodiment.

FIG. 14 is a block diagram of an intra prediction apparatus 1400 according to an exemplary embodiment. Referring to FIG. 14, the intra prediction apparatus 1400 includes a sampling unit 1410 (e.g., sampler), a parameter obtaining unit 1420 (e.g., parameter obtainer), and a prediction performing unit 1430 (e.g., prediction performer).

If a luminance block is larger than a chrominance block corresponding thereto, the sampling unit 1410 down-samples pixels of a restored luminance block and neighboring pixels thereof to equalize the size of a luminance signal and the size of a chrominance signal with each other.

The parameter obtaining unit 1420 obtains parameters representing a correlation between a chrominance block and a luminance block, based on restored neighboring pixels of the chrominance block and restored neighboring pixels of a luminance block corresponding to the chrominance block. In particular, the parameter obtaining unit 1410 may perform a scaling process of changing bit depths of the parameters to change the size of a look-up table which will be described below and to prevent overflow from occurring when an operation is performed to obtain the parameters. Operations of the parameter obtaining unit 1410 will be described in detail below.

The prediction performing unit 1430 predicts a chrominance pixel from a restored luminance pixel corresponding thereto by using the parameters.

Figure 15A:
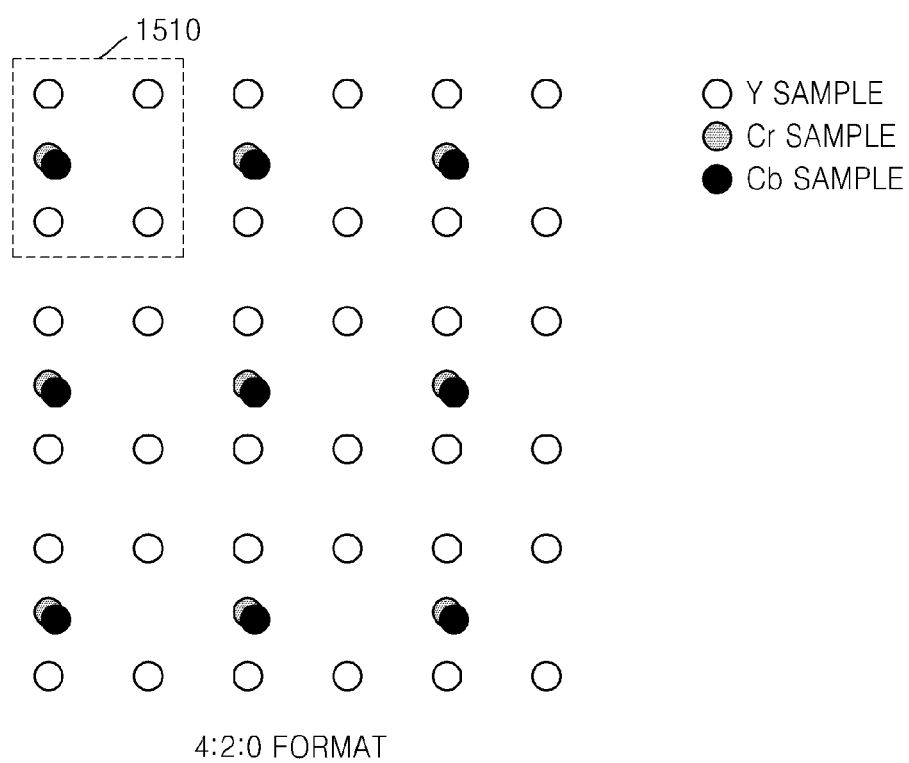
FIGS. 15A to 15C are reference diagrams illustrating color formats.
Figure 15B:
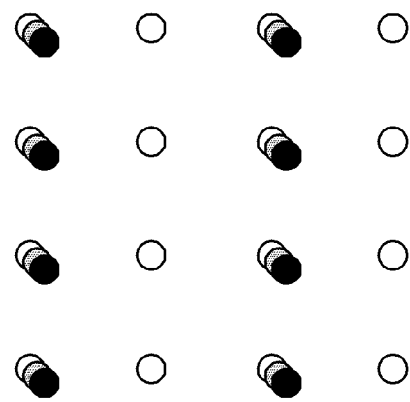
Figure 15C:
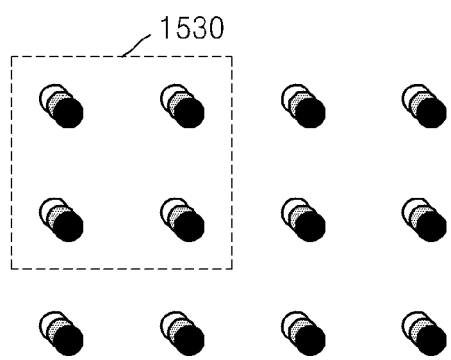

FIGS. 15A to 15C are reference diagrams illustrating color formats each including a plurality of color components. FIGS. 16A and 16B are reference diagrams each illustrating a luminance block and a chrominance block according to a color format.

In a 4:2:0 color format, a 4:2:2 color format, and a 4:4:4 color format of FIGS. 15A, 15B, and 15C, each numerical value indicates a relative ratio of sampling performed in a horizontal direction. For example, in the 4:4:4 color format, four Cb pixels and four Cr pixels exist for four Y pixels 1530. Referring to FIG. 16A, in the 4:4:4 color format, when the size of a Y luminance block is 2N×2M, the sizes of Cb and Cr chrominance blocks corresponding to the Y luminance block are also each 2N×2M. Here, 'N' and 'M' denote integers. In the 4:2:2 color format, the chrominance components Cb and Cr have a resolution equal to that of the luminance component Y in the horizontal direction, but have a resolution half that of the luminance component in a vertical direction. In other words, in the 4:2:2 color format, two Cb pixels and two Cr pixels exist for four luminance pixels 1510 in the horizontal direction. In the 4:2:0 color format, the chrominance components Cb and Cr have a resolution half the resolution of the luminance component Y in both vertical and horizontal directions. In other words, the number of pixels of each of the chrominance components Cb and Cr is 1/4 times that of pixels of the luminance component Y. As illustrated in FIG. 16B, in the 4:2:0 format, a luminance block Y has a size of 2N×2M but chrominance blocks Cb and Cr corresponding to the luminance block Y each has a size of N×M that are half the size of the luminance block Y in both the horizontal and vertical directions.

Thus, if the luminance block Y is larger than the chrominance blocks Cb and Cr as in the 4:2:2 color format or the 4:2:0 color format, the sampling unit 1410 may down-sample a restored luminance block and neighboring pixels thereof so that a luminance signal and a chrominance signal may match in a 1:1.

Figure 17:
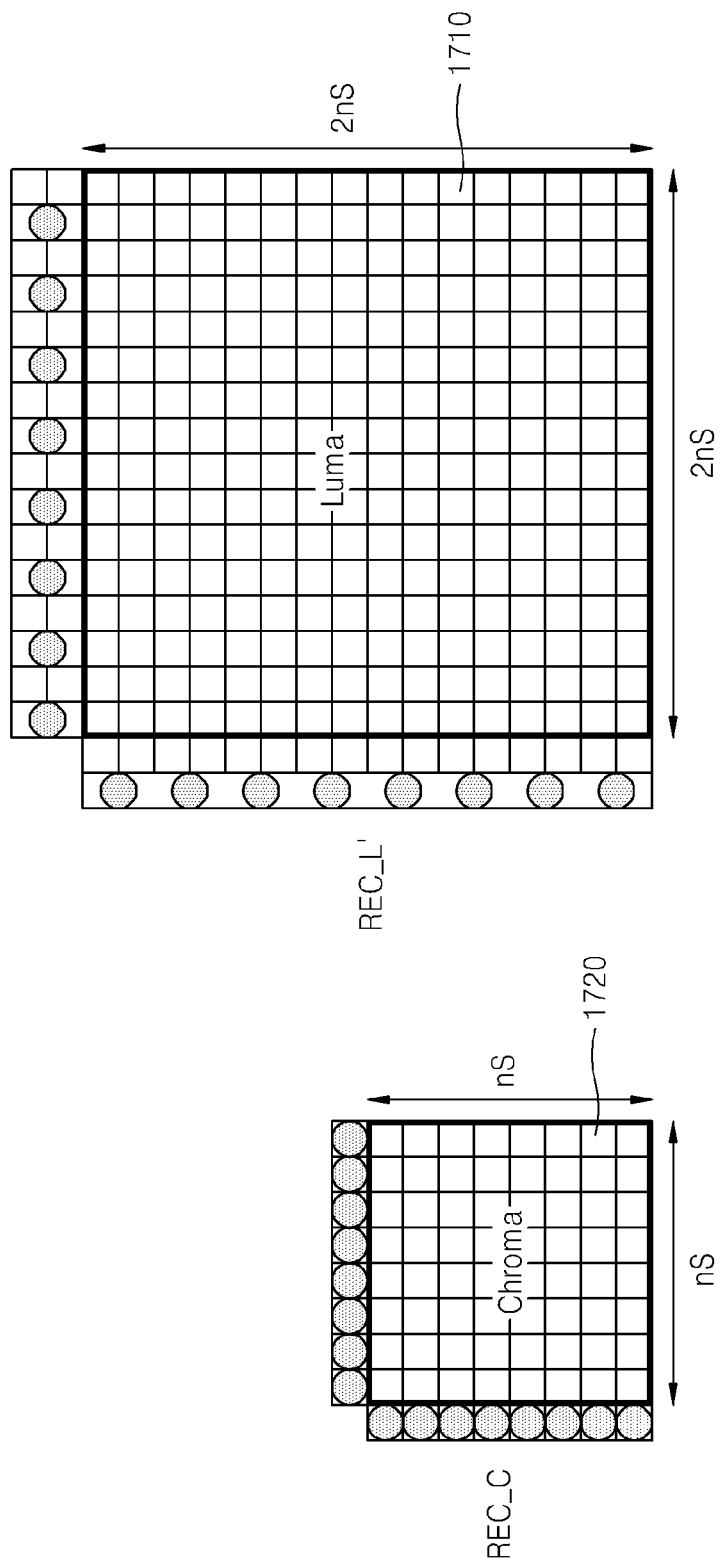
FIG. 17 is a reference diagram illustrating a process of down-sampling a luminance signal, according to an exemplary embodiment.

FIG. 17 is a reference diagram illustrating a process of down-sampling a luminance signal, according to an exemplary embodiment. Referring to FIG. 17, if the sizes of a luminance block 1710 and a chrominance block 1720 are respectively 2nS×2nS and nS×nS, then the sampling unit 1410 of FIG. 14 down-samples the luminance block 1710 and neighboring pixels thereof at a ratio of 1/2. Here, 'nS' denotes a positive integer. Specifically, the sampling unit 1410 down-samples a restored luminance signal Rec_L to produce a down-sampled luminance signal Rec_L'(x,y), based on Equations (1) and (2) below.

According to Equation (1), luminance pixels present in a current block and luminance pixels adjacent to a left side of the current block may be precisely down-sampled according to a relative location of a chrominance sample.

$$\text{Rec\_}L'(x,y)=(\text{Rec\_}L(2x,2y)+\text{Rec\_}L(2x,2y+1))\gg 1 \quad (1),$$

wherein x=−1, . . . , nS−1, and y=0, . . . , nS−1.

According to Equation (2), luminance pixels adjacent to an upper side of the current block are down-sampled by only using pixels in a first upper line of the current block to reduce a number of buffer lines of luminance pixels from two to one in an intra prediction method according to an exemplary embodiment.

$$\text{Rec\_}L'(x,y)=(\text{Rec\_}L(2x-1,2y+1)+2*\text{Rec\_}L(2x,2y+1)+\text{Rec\_}L(2x+1,2y+1)+2)\gg 2 \quad (2),$$

wherein x=0, . . . , nS−1, and y=−1.

If low-pass filtering expressed in Equation (2) is skipped, an equation: REC_L'(x,y)=Rec_L(2x,2y+1)(x=0, . . . , nS−1, y=−1) may be used instead of Equation (2).

It is assumed that from among pixels at a location (x,y), pixels, the value of 'x' of which is −1, are neighboring pixels adjacent to a left side of the current block and pixels, the value of 'y' of which is −1, are neighboring pixels adjacent to an upper side of the current block. Also, it is assumed that from among pixels present in an nS×nS block, the coordinates of an upper leftmost pixel and a lower rightmost pixel are respectively (0,0) and (nS−1, nS−1).

The luminance signal Rec_L'(x,y) that is down-sampled according to Equation (1) or (2) is used only when the 4:2:2 color format or the 4:2:0 color format is used. If the 4:4:4 color format is used, a restored luminance signal Rec_L(x,y) may be directly used to predict a chrominance signal and a down-sampling process may be skipped.

In the case of the 4:4:4 color format, a U signal and a V signal have a far lower frequency band than a Y signal. Thus, low-pass filtering may be additionally performed on a restored luminance signal to improve the efficiency of prediction, instead of down-sampling filtering.

Figure 18A:
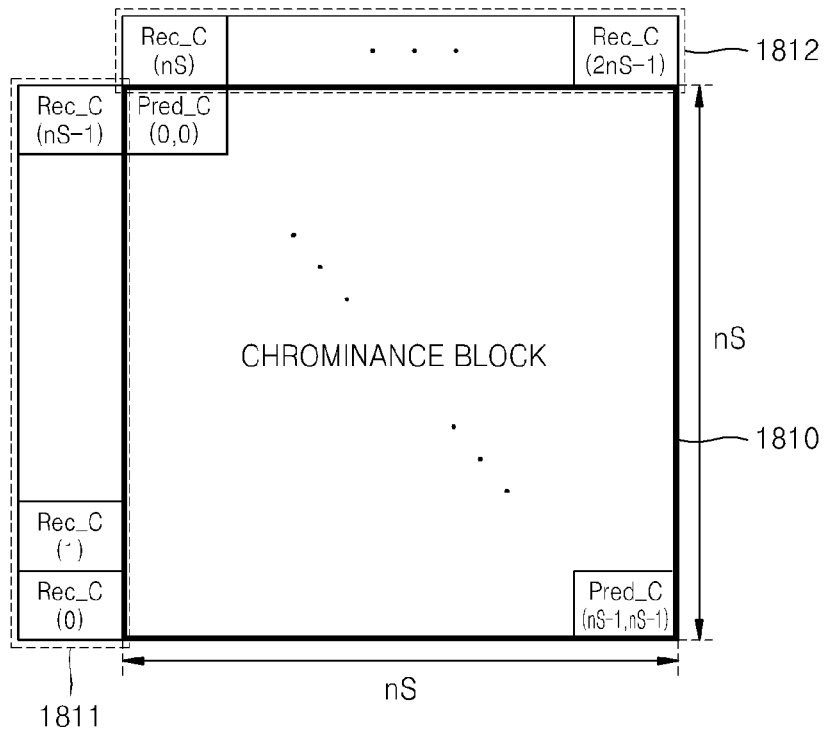
FIGS. 18A and 18B are reference diagrams illustrating a process of obtaining parameters representing a correlation between a luminance signal and a chrominance signal and a process of predicting a chrominance signal, according to an exemplary embodiment.
Figure 18B:
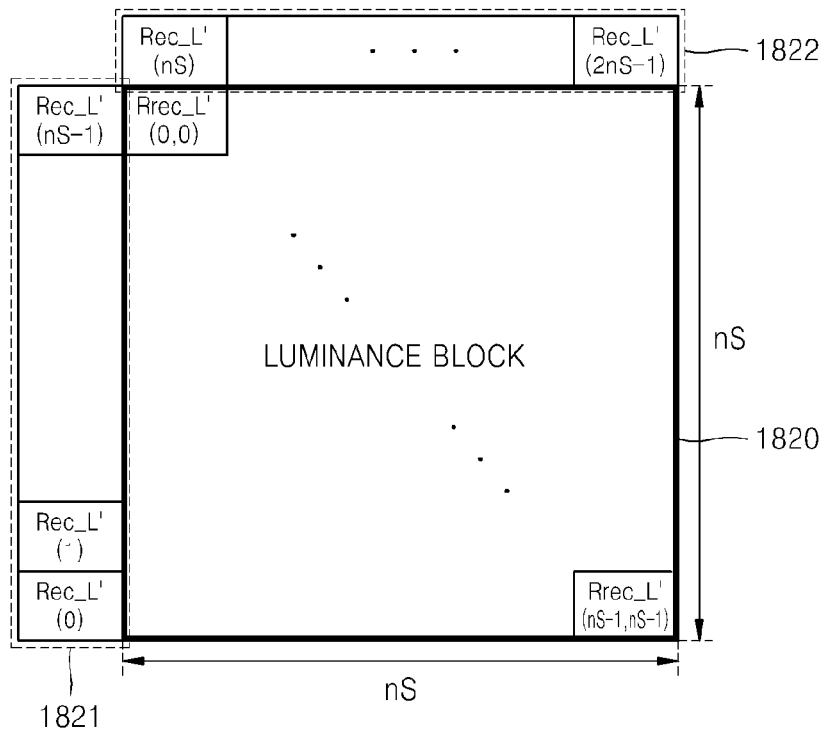

FIGS. 18A and 18B are reference diagrams illustrating a process of obtaining parameters representing a correlation between a luminance signal and a chrominance signal and a process of predicting a chrominance signal, according to an exemplary embodiment.

As described above, a correlation, e.g., a linear correlation, is present between corresponding luminance and chrominance pixels. Referring to FIGS. 18A and 18B, if a pixel at a location (x,y) on a previously restored luminance block 1820 is Rec_L'(x,y), then the prediction performing unit 1430 of FIG. 14 may obtain a predicted pixel Pred_c (x,y) at a location (x,y) on a chrominance block 1810, based on a linear correlation between a luminance signal and a chrominance signal, as expressed in Equation (3).

$$\text{Pred}\_c(x,y) = a \cdot \text{Rec}\_L'(x,y) + b \qquad (3).$$

wherein 'a' denotes a parameter representing a weight and 'b' denotes a parameter representing an offset. The values of the parameters a and b may be calculated by performing an operation that uses neighboring pixels Rec_c(i) 1811 and 1812 of the chrominance block 1810 and neighboring pixels Rec_L'(i) 1821 and 1822 of the luminance block 1821, as expressed in Equations (4) and (5). Here, i=0, . . . , 2nS−1.

$$a = \frac{I \cdot \sum_{i=0}^{I-1} \text{Rec}\_c(i) \cdot \text{Rec}\_L'(i) - \sum_{i=0}^{I-1} \text{Rec}\_c(i) \cdot \sum_{i=0}^{I-1} \text{Rec}\_L'(i)}{I \cdot \sum_{i=0}^{I-1} \text{Rec}\_L'(i) \cdot \text{Rec}\_L'(i) - \left(\sum_{i=0}^{I-1} \text{Rec}\_L'(i)\right)^2} = \frac{A1}{A2} \qquad (4)$$

$$b = \frac{\sum_{i=0}^{I-1} \text{Rec}\_c(i) - a \cdot \sum_{i=0}^{I-1} \text{Rec}\_L'(i)}{I}, \qquad (5)$$

wherein 'I' denotes the number of neighboring pixels adjacent to an upper or left side of the chrominance block 1810 or the luminance block 1820. Referring to FIGS. 18A and 18B, if the sizes of the chrominance block 1810 and the luminance block 1820 are each nS×nS, then the number I of neighboring pixels is 2nS. Although FIGS. 18A and 18B illustrate a case where pixels adjacent to upper and left sides of a current block are used as neighboring pixels to obtain the parameters a and b, pixels adjacent to a right or lower side of the current block may be used as neighboring pixels when the neighboring pixels adjacent to the right or lower side of the current block have been restored before the current block is processed. The number I of neighboring pixels may be a power of 2 so that a shift operation may be performed instead of a multiplication or division operation. In general, since nS denoting a block size is a power of 2, the number I of neighboring pixels is also a power of 2.

A floating point operation may be used to precisely calculate the parameter a according to Equation (4). However, if the parameter a is a floating point number, floating point division should be performed when Equation (4) is used, thereby increasing the complexity of calculation. Thus, in order to prevent the occurrence of a bit overflow and simplify the calculation, the parameter obtaining unit 1420 of FIG. 14 may calculate parameters a' and b' by scaling the parameters a and b according to an integral calculation algorithm that is a modification of Equations (4) and (5).

Specifically, in order to avoid the floating point operation, the parameter a' that is an integer obtained by up-scaling as much as na bits and rounding the parameter is defined instead of the parameter a according to Equation (4), as follows:

$$a' = a \cdot (1 << n_a) = \frac{A1}{A2} \cdot (1 << n_a) \qquad (6)$$

According to Equation (6), the parameter a (a floating point number) is up-scaled and rounded to the parameter a' (an integer) by performing a left bitwise operation (<<). The na bits may be set in consideration of the precision of data and the complexity of calculation. For example, 'na' may be '13'. The parameter b (a floating point number according to Equation (5)) may also be rounded to the parameter b' (an integer) by using the parameter a' according to Equation (6). If the modified parameters a' and b' are used, Equation (3) may be changed as follows:

$$\text{Pred}\_c(x,y) = (a' \cdot \text{Rec}\_L'(x,y) \gg n_a) + b' \qquad (7)$$

'A1/A2' expressed in Equation (6) should be calculated to calculate the parameter a' based on Equation (6). The values A1 and A2 may be respectively replaced with approximated values A1' and A2' obtained by changing bits included in A1 and A2 except for a predetermined number of upper bits therein to '0'. Specifically, the approximated value A1' obtained by changing bits included in the value A1, except for upper nA1 bits therein, to '0' and the approximated value B1' obtained by changing bits included in the value B1, except for upper nA2 bits therein, to '0', may be expressed as follows:

$$A1' = [A1 \gg r_{A1}] \cdot 2^{r_{A1}} \qquad (8)$$

$$A2' = [A2 \gg r_{A2}] \cdot 2^{r_{A2}} \qquad (9)$$

In Equation (8), '[.]' denotes a floor operation, i.e., an operation of selecting a maximum integer that is less than a value included in [ ], rA1=max(bdepth(A1)−nA1, 0), and rA2=max(bdepth(A2)−nA2, 0). Here, 'bdepth(A1)' and 'bdepth(A2)' respectively denote a bit depth of the value A1 and a bit depth of the value A2. 'nA1' may be set to prevent the occurrence of a bit overflow and in consideration of a number of bits obtained when a multiplication operation is performed. For example, 'nA1' may be '15'. 'nA2' is related to the size of a look-up table which will be described below. For example, when a look-up table is based on 64 variables, 'nA2' may be '6'.

Figures 19, 20:
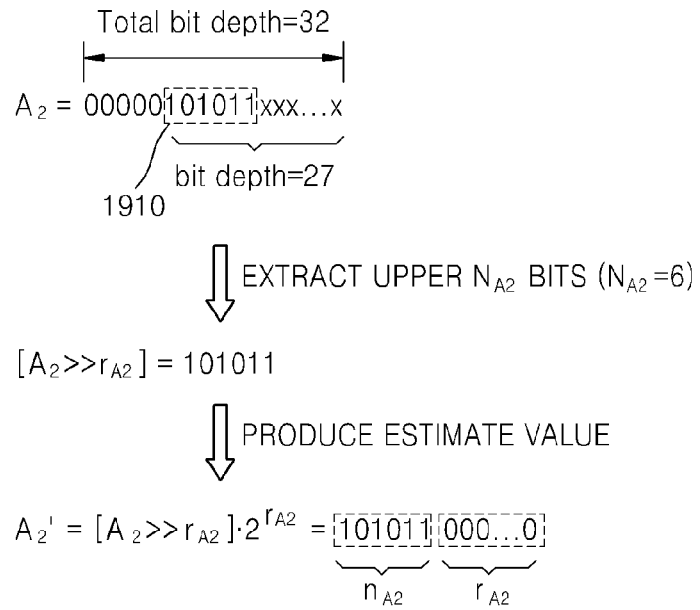
FIG. 19 illustrates a process of obtaining an approximated value A2', according to an exemplary embodiment.
FIG. 20 is a reference diagram illustrating a look-up table according to an exemplary embodiment.

FIG. 19 illustrates a process of obtaining the approximated value A2', according to an exemplary embodiment. Referring to FIG. 19, it is assumed that the value A2 has a bit depth of 27 and an overall bit depth is '32'. If nA2=6, then rA2=max (27-6, 0)=21. Also, [A2>>21] may be calculated to extract six upper bits 1910, e.g., '101011', of the value of A2. If a result of calculating [A2>>21] is multiplied by 2rA2, i.e., 221, then the remaining 21 bits except for the six upper bits are '0', thereby obtaining the approximated value A2'.

When Equations (8) and (9) are substituted into Equation (6), Equation (10) is obtained as follows:

$$a' \approx \frac{[A1 \gg r_{A1}] \cdot 2^{r_{A1}}}{[A2 \gg r_{A2}] \cdot 2^{r_{A2}}} \cdot 2^{n_a} = \frac{2^{n_{table}} \cdot [A1 \gg r_{A1}] \cdot 2^{r_{A1}+n_a}}{[A2 \gg r_{A2}] \cdot 2^{r_{A2}+n_{table}}} \qquad (10)$$

$$\approx \left[\frac{2^{n_{table}}}{A2 \gg r_{A2}}\right] \cdot [A1 \gg r_{A1}] \cdot 2^{r_{A1}+n_a-(r_{A2}+n_{table})},$$

wherein 'ntable' may be determined in consideration of the precision of data and the complexity of calculation. For example, ntable may be set to '15'.

In Equation (10), $$\left[\frac{2^{n_{table}}}{A2 \gg r_{A2}}\right]$$

includes a division operation. To avoid the division operation, a result of calculating $$\left[\frac{2^{n_{table}}}{A2 \gg r_{A2}}\right]$$

may be instead stored in a look-up table. Thus, the parameter a' may be calculated according to Equation (10), based on the look-up table. If the look-up table is used as described above, the parameter a' may be calculated by only using a multiplication operation and a shift operation according to Equation (10) without having to perform the division operation.

FIG. 20 is a reference diagram illustrating a look-up table according to an exemplary embodiment.

If nA2=6, then a number of cases of $$\left[\frac{2^{n_{table}}}{A2 \gg r_{A2}}\right]$$

is equal to a number of cases of upper six bits of the value A2. In other words, $2^{(nA2)}=2^6$, and $$\left[\frac{2^{n_{table}}}{A2 \gg r_{A2}}\right]$$

may be determined based on a look-up table consisting of a total of 64 elements. Thus, the parameter obtaining unit 1420 of FIG. 14 may obtain a value of $$\left[\frac{2^{n_{table}}}{A2 \gg r_{A2}}\right],$$

based on the look-up table that stores various possible values of $$\left[\frac{2^{n_{table}}}{A2 \gg r_{A2}}\right]$$

corresponding to 64 variables as shown in FIG. 20, which the six upper bits of the parameter a2 may have. After the value of $$\left[\frac{2^{n_{table}}}{A2 \gg r_{A2}}\right]$$

is obtained, the parameter obtaining unit 1420 may calculate the parameter a' by only using the multiplication operation and the shift operation, based on Equation (10).

Also, the parameter obtaining unit 1420 may calculate a parameter b' by using the calculated parameter a', as follows:

$$b' = \frac{\sum_{i=0}^{I-1} \text{Rec\_c}(i) - \left(a' \cdot \left(\sum_{i=0}^{I-1} \text{Rec\_L}'(i)\right) \gg n_a\right)}{I} \quad (11)$$

The calculation of the parameter b' based on Equation (11) may be performed without having to perform a division operation, when a number 'I' of neighboring pixels expressed in Equation (11) is a power of 2. If the number 'I' of neighboring pixels is not a power of 2 since a pixel adjacent to an upper left or right side of a current pixel is used as a neighboring pixel unlike in FIGS. 18A and 18B, then '1/I' may be stored in a look-up table, and the parameter b' may be calculated by multiplying the numerators in Equation (11) by '1/I' stored in the look-up table.

The parameter a' based on Equation (10) may be clipped so that the multiplication operation included in Equation (7) may be performed within a predetermined range of bits. For example, if the multiplication operation in Equation (7) is performed using 16 bits, the parameter a' is clipped within a range of [−2−15, 215−1]. If na is '13', an actual value of the parameter a is limited within a range of [−4, 4), thereby preventing amplification of an error.

When the parameter a' is calculated based on Equation (10), the parameter obtaining unit 1420 may not determine 'na' to be a constant and may determine 'na' to be adaptive to the values of A1 and A2 so as to reduce a rounding error. For example, na may be obtained as follows:

$$n_a = r_{A2} + n_{table} - r_{A1} \quad (12)$$

When Equation (12) is substituted into Equation (10), Equation (13) is obtained as follows:

$$a' \approx \left[\frac{2^{n_{table}}}{A2 \gg r_{A2}}\right] \cdot [A1 \gg r_{A1}] \quad (13)$$

A bit depth of the parameter a' may be adjusted to maintain the parameter a' as predetermined bits. For example, if a variable bitAdjust for adjusting the bit depth of the parameter a' to maintain the bit depth of the parameter a' as bits a_bits is expressed as an equation: bitAdjust=max(0, bdepth(abs(a'))−(a_bits−1)), then the parameter obtaining unit 1420 reduces the bit depth of the parameter a' by using an equation: a'=a'>>bitAdjust. A value of a_bits may be set to '7' or '8' so that the parameter a' may be maintained to be less than 8 bits. If 'na' expressed in Equation (14) is applied into Equation (7), instead of 'na' in Equation (12), it is possible to reduce an error that may occur when the parameter a' is rounded while the parameter a' is maintained within the predetermined range of bits.

$$n_a = r_{A2} + n_{table} - r_{A1} - \text{bitAdjust} \quad (14)$$

As described above, the parameter obtaining unit 1420 may obtain the parameters a' and b' that define a correlation between a luminance signal and a chrominance signal, based on Equation (10) or (11). After the parameters a' and b' are obtained, the prediction performing unit 1430 of FIG. 14 produces a predicted value of a chrominance pixel from a restored luminance pixel corresponding to the chrominance pixel, based on Equation (7).

Meanwhile, Equation (4) may be expressed as follows:

$$a = \frac{A1}{A2} = \frac{I \cdot CL - C \cdot L}{I \cdot LL - L \cdot L} \quad (15)$$

'CL', 'C', 'L' and 'LL' expressed in Equation (15) may be calculated as follows:

$$CL = \sum_{i=0}^{I-1} \text{Rec\_c}(i) \cdot \text{Rec\_L}'(i) \quad (16)$$

$$C = \sum_{i=0}^{I-1} \text{Rec\_c}(i)$$

$$LL = \sum_{i=0}^{I-1} \text{Rec\_L}'(i) \cdot \text{Rec\_L}'(i)$$

$$L = \sum_{i=0}^{I-1} \text{Rec\_L}'(i)$$

In order to prevent a bit overflow from occurring when the parameter a is calculated according to Equation (15), the parameter obtaining unit 1420 performs de-scaling to reduce a number of bits in each of 'CL', 'C', 'L' and 'LL'.

For example, if the numbers of bits of, for example, samples Rec_L'(i) and Rec_c(i), are each defined to be 'ns', then the maximum number of bits bitsmax of each of the values A1 and A2 may be calculated as follows:

$$\text{bits}_{max} = (n_s + b\text{depth}(I)) \cdot 2 + 1 \quad (17)$$

In order to maintain the maximum number of bits bitsmax as predetermined A bits, a bit depth of each of the values A1 and A2 may be reduced by bits, the number of which is greater than a number of the A bits. Here, 'A' denotes an integer. For example, if A=32, a bit adjustment parameter bitAdjustA may be defined as follows:

$$\text{bitAdjust}_A = \max(\text{bits}_{max} - 32, 0)$$

The parameter obtaining unit 1420 scales the values A1 and A2 based on Equation (18), as follows:

$$A1 = I \cdot [CL \gg \text{bitAdjust}_A] - [L \gg \text{bitAdjust}_A/2] \cdot [C \gg \text{bitAdjust}_A/2]$$

$$A2 = I \cdot [LL \gg \text{bitAdjust}_A] - [L \gg \text{bitAdjust}_A/2] \cdot [L \gg \text{bitAdjust}_A/2] \quad (19)$$

If a number I of neighboring pixels is power of 2, the bit adjustment parameter bitAdjustA may be redefined as a bit adjustment parameter bitAdjust2A, as follows:

$$\text{bitAdjust2}_A = (\text{bitAdjust}_A + 1)/2 \quad (20)$$

Before the values A1 and A2 are calculated, the parameter obtaining unit 1420 may de-scale 'CL', 'C', 'LL', 'L' and 'I' by using the bit adjustment parameter bitAdjust2A, as follows:

$$CL = [CL \gg \text{bitAdjust2}_A]$$

$$C = [C \gg \text{bitAdjust2}_A]$$

$$LL = [LL \gg \text{bitAdjust2}_A]$$

$$L = [L \gg \text{bitAdjust2}_A]$$

$$I = [I \gg \text{bitAdjust2}_A]$$

As described above, according to an exemplary embodiment, in order to prevent the occurrence of a bit overflow, the parameter obtaining unit 1420 may reduce the bit depths of the values A and B by de-scaling 'CL', 'C', 'LL', 'L' and 'I' used to calculate the values A1 and A2, in consideration of a range of the values A1 and A2 and according to Equation (21).

According to another exemplary embodiment, the parameter obtaining unit 1420 calculates a parameter k3, based on a value nS that define the sizes of the chrominance block 1810 and the luminance block 1820 of FIGS. 18A and 18B and a bit depth BitDepthC of the sample Rec_C(i), as follows:

$$k3 = \text{Max}(0, \text{BitDepth}_C + \log_2(nS) - 14) \quad (22)$$

In order to prevent a bit overflow from occurring during the calculation of the values A1 and A2, the parameter obtaining unit 1420 de-scales 'CL', 'C', 'LL', and 'L', as follows:

$$CL = CL \gg k3$$

$$C = C \gg k3$$

$$LL = LL \gg k3$$

$$L = L \gg k3 \quad (23)$$

Also, the parameter obtaining unit 1420 obtains a parameter k2 based on the parameter k3 and the value nS, as follows:

$$k2 = \log_2((2 * nS) \gg k3) \quad (24)$$

Also, the parameter obtaining unit 1420 may obtain the values A1 and A2 by using 'CL', 'C', 'LL', and 'L' that are de-scaled according to Equation (23) and the parameter k2 according to Equation (24), as follows:

$$A1 = (LC \ll k2) - L * C$$

$$A2 = (LL \ll k2) - L * L \quad (25)$$

The parameter obtaining unit 1420 may calculate values A1' and A2' by down-scaling the values A1 and A2 so that the values A1 and A2 may be expressed within a predetermined range of bits, as follows:

$$A1' = A1 \gg \text{Max}(0, \log_2(abs(A1)) - 14)$$

$$A2'abs(A2 \gg \text{Max}(0, \log_2(abs(A2)) - 5)) \quad (26)$$

After the values A1' and A2' are obtained as described above, the parameter obtaining unit 1420 obtains a weight a and an offset b that define a linear correlation between a luminance signal and a chrominance signal, by using the following algorithm:

```
{
k1=Max(0,log₂(abs(A2 )-5 -Max(0,log₂(abs(A1 )-14 +2;
a=A2'<1 ? 0 : Clip3(-2¹⁵,2¹⁵-1,A1'*lmDiv+ 1<<(k1-1 )>>k1;
a=a>>Max(0,log₂(abs(a))-6 ;
k=13-Max(0,log₂(abs(a))-6 ;
b=(L-((a*C)>>k1 + 1<<(k2-1 ))>>k2;
}
```

In the above algorithm, all constants may be determined in such a manner that the weight a may be expressed with 7-bit data, and 'lmDiv' denotes a value determined according to the value A2' according to Equation (25).

According to another exemplary embodiment, when the weight a and the offset b are determined according to the above algorithm, the prediction performing unit 1430 obtains a predicted value Pred_C(x,y) of a chrominance signal corresponding to a restored luminance signal Rec_L'(x,y), as follows:

$$\text{Pred\_C}(x,y) = (a \cdot \text{Rec\_L}'(x,y)) \gg k) + b \quad (27)$$

The prediction performing unit 1430 may clip the predicted value Pred_C(x,y) of the chrominance signal according to Equation (27), in consideration of a bit depth of the chrominance signal, so that the predicted value Pred_C(x,y) may fall within a range of values that the chrominance signal may have.

Figure 21:
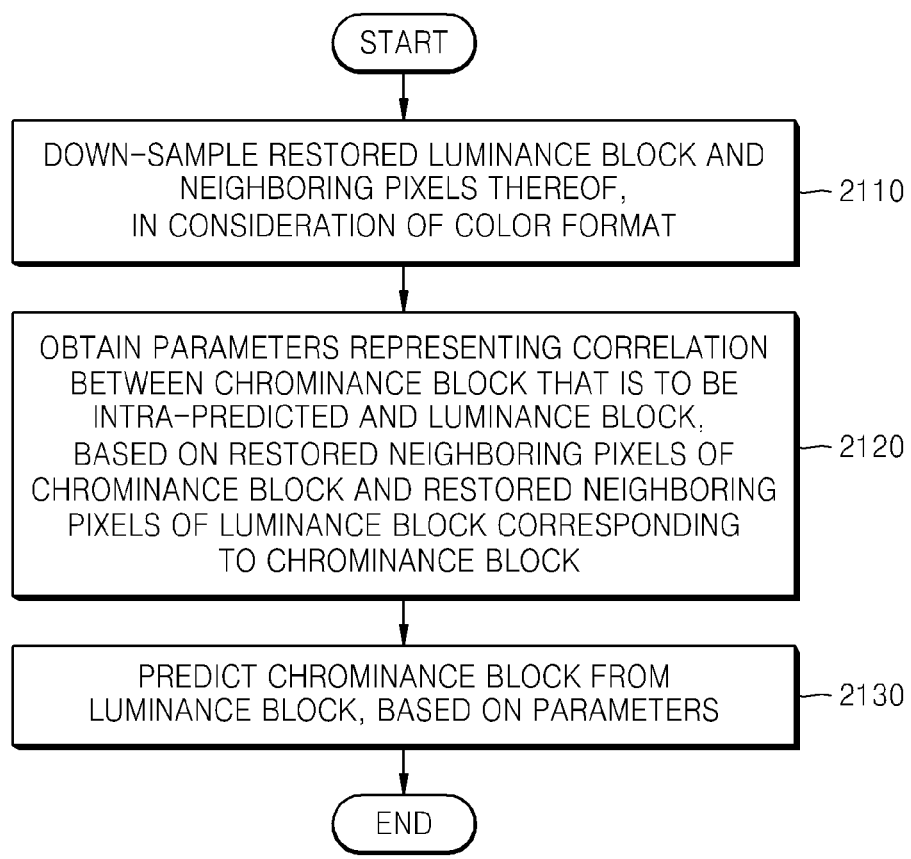
FIG. 21 is a flowchart illustrating an intra prediction method according to an exemplary embodiment.

FIG. 21 is a flowchart illustrating an intra prediction method according to an exemplary embodiment. Referring to FIGS. 14 and 21, in operation 2110, if the sizes of a chrominance block and a luminance block are not the same, then the sampling unit 1410 performs sampling on a luminance signal by sampling a restored luminance block and neighboring pixels thereof so that the intensities of a chrominance signal and the luminance signal may be equalized with each other. As described, the sampling may be performed in a 4:2:0 or 4:2:2 color format in which the intensities of a luminance signal and a chrominance signal are not identical to each other, and may be skipped in a 4:4:4 color format.

In operation 2120, the parameter obtaining unit 1420 obtains parameters representing a correlation between the chrominance block and the luminance block, based on restored neighboring pixels of the chrominance block that is to be intra-predicted and restored neighboring pixels of a luminance block corresponding to the chrominance block. As described above, the parameter obtaining unit 1420 may calculate a weight a and an offset b according to Equations (4) and (5), based on the restored neighboring pixels of the chrominance block and the restored neighboring pixels of the luminance block. In particular, the parameter obtaining unit 1420 may change bit depths of the weight a and the offset b to increase the precision of data and prevent a bit overflow from occurring during the calculation. Also, the parameter obtaining unit 1420 may scale variables used to calculate the weight a and the offset b or replace approximated values for the variables so that the weight a and the offset b may be calculated by using only multiplication, subtraction, and shift operations without having to perform a division operation.

In operation 2130, the prediction performing unit 1430 predicts a chrominance block from the luminance block, based on the parameters. As described above, the prediction performing unit 1430 may predict a corresponding chrominance signal from a restored luminance signal according to Equation (3). Alternatively, the prediction performing unit 1430 may predict the chrominance block by up-scaling the weight a and the offset b according to Equation (7) in order to perform an integral operation instead of the floating point operation.

Exemplary embodiments can be embodied as computer readable code in a computer readable medium. Here, the computer readable medium may be any recording apparatus capable of storing data that is read by a computer system, e.g., read-only memory (ROM), random access memory (RAM), compact disc (CD)-ROM, a magnetic tape, a floppy disk, an optical data storage device, and so on. The computer readable medium can be distributed among computer systems that are interconnected through a network, and exemplary embodiments may be stored and implemented as computer readable code in the distributed system. Moreover, it is understood that in exemplary embodiments, one or more units of the above-described apparatuses can include circuitry, a processor, a microprocessor, etc., and may execute a computer program stored in a computer-readable medium.

While exemplary embodiments have been particularly shown and described above, it will be understood by those of ordinary skill in the art that various changes in form and details may be made therein without departing from the spirit and scope of the present invention as defined by the following claims.

The invention claimed is:

1. A method of intra-predicting an image, the method comprising:
obtaining, based on restored neighboring pixels of a chrominance block and restored neighboring pixels of a luminance pixel corresponding to the chrominance block, parameters representing a correlation between the chrominance block that is to be intra-predicted and a luminance block; and
predicting, using the parameters, the chrominance block from the luminance block,
wherein the obtaining the parameters comprises performing a predetermined operation on the restored neighboring pixels of the chrominance block and the restored neighboring pixels of the luminance block, and
wherein the predetermined operation comprises an adaptive scaling process of changing bit depths of the parameters.

2. The method of claim 1, wherein the parameters comprise a weight and an offset that define a linear correlation between restored pixels of the luminance block and pixels of the chrominance block corresponding to the restored pixels of the luminance block.

3. The method of claim 2, wherein, if a restored pixel present at a location (x,y) on the luminance block is Rec_L'(x,y), a prediction value of a pixel present at a location (x,y) on the chrominance block is Pred_C(x,y), the weight is a, and the offset is b, then the correlation is defined by Pred_C(x,y)=a*Rec_L'(x,y)+b.

4. The method of claim 3, wherein, if I number of restored neighboring pixels of the luminance block are Rec_L'(i) and I number of restored neighboring pixels of the chrominance block are Rec_C(i), then the weight a is determined by:

$$a = \frac{I \cdot \sum_{i=0}^{I-1} \text{Rec\_c}(i) \cdot \text{Rec\_L}'(i) - \sum_{i=0}^{I-1} \text{Rec\_c}(i) \cdot \sum_{i=0}^{I-1} \text{Rec\_L}'(i)}{I \cdot \sum_{i=0}^{I-1} \text{Rec\_L}'(i) \cdot \text{Rec\_L}'(i) - \left(\sum_{i=0}^{I-1} \text{Rec\_L}'(i)\right)^2} = \frac{A1}{A2},$$

wherein 'i' denotes an integer ranging from '0' to (I−1).

5. The method of claim 4, wherein the offset b is determined by:

$$b = \frac{\sum_{i=0}^{I-1} \text{Rec\_c}(i) - a \cdot \sum_{i=0}^{I-1} \text{Rec\_L}'(i)}{I}.$$

6. The method of claim 4, further comprising:
calculating estimated values A1' and A2' by respectively approximating values A1 and A2 by using a predetermined number of upper bits; and
calculating an integer a' by up-scaling the weight a by predetermined na bits, based on the estimated values A1' and A2'.

7. The method of claim 6, wherein, if nA1 denotes a number of upper bits extracted from the value A1, nA2 denotes a number of upper bits extracted from the value A2, rA1=max(bdepth(A1)−nA1, 0), rA2=max(bdepth(A2)−nA2, 0), bdepth(A1) denotes a bit depth of the value A1, bdepth(A2) denotes a bit depth of the value A2, and ntable denotes a predetermined constant, then the estimated value A1' is determined by:

$$A1'=[A1 \gg r_{A1}] \cdot 2^{r_{A1}}$$

the estimated value A2' is determined by:

$$A2'=[A2 \gg r_{A2}] \cdot 2^{r_{A2}}, \text{ and}$$

the integer a' is determined by:

$$a' \approx \left[\frac{2^{n_{table}}}{A2 \gg r_{A2}}\right] \cdot [A1 \gg r_{A1}] \cdot 2^{r_{A1}+n_a \cdot (r_{A2}+n_{table})}.$$

8. The method of claim 7, wherein a result of calculating $$\left[\frac{2^{n_{table}}}{A2 \gg r_{A2}}\right]$$

is obtained from a predetermined look-up table.

9. The method of claim 4, wherein the weight a is calculated based on values obtained by respectively down-scaling CL, C, LL, and L defined in the following equation, as much as predetermined bits:

$$CL = \sum_{i=0}^{I-1} \text{Rec\_c}(i) \cdot \text{Rec\_L}'(i)$$

$$C = \sum_{i=0}^{I-1} \text{Rec\_c}(i)$$

$$LL = \sum_{i=0}^{I-1} \text{Rec\_L}'(i) \cdot \text{Rec\_L}'(i)$$

$$L = \sum_{i=0}^{I-1} \text{Rec\_L}'(i).$$

10. The method of claim 9, wherein, if a size of the chrominance block is nSxnS and a bit depth of a chrominance pixel is BitDepthC, then bit depths of the CL, C, LL, and L are reduced by down-scaling the CL, C, LL, and L by k3 bits defined by:

$$k3=\text{Max}(0, \text{BitDepth}_c + \log_2(nS) - 14),$$

wherein nS denotes a positive integer.

11. The method of claim 10, further comprising, if k2 is a variable defined by k2=log$_2$((2*ns)>>k3), calculating the values A1 and A2 by:

$$A1=(LC \ll k2) - L*C$$

$$A2=(LL \ll k2) - L*L.$$

12. The method of claim 11, further comprising calculating estimated values A1' and A2' by respectively down-scaling the values A1 and A2 by predetermined bits based on absolute values of the values A1 and A2, wherein the weight a and the offset b are determined by the following algorithm:

```
{
k1=Max(0,log2(abs(A2 )-5 -Max(0,log2(abs(A1 )-14 +2;
a=A2'<1 ? 0 : Clip3(-215,215-1,A1'*lmDiv+ 1<<(k1-1 )>>k1;
a=a>>Max(0,log2(abs(a))-6 ;
k=13-Max(0,log2(abs(a))-6 ;
b=(L-((a*C)>>k1 + 1<<(k2-1 ))>>k2;
}.
```

13. The method of claim 3, wherein the predicting the chrominance block comprises predicting the predicted pixel Pred$_{13}$ C(x,y) at the location (x,y) on the chrominance block by using an integer a' obtained by up-scaling the weight a by predetermined na bits and an integer b' obtained by rounding the offset b, according to the following equation:

$$\text{Pred}_{13}\ c(x,y)=(a' \cdot \text{Rec\_L}'(x,y) \gg n_a)+b'.$$

14. The method of claim 13, further comprising clipping the predicted value Pred_C(x,y) to be within a range of values of pixels of the chrominance block.

15. The method of claim 1, further comprising, if a size of the chrominance block is not equal to a size of the luminance block, sampling the restored luminance block and the neighboring pixels thereof to equalize the size of the chrominance signal with the size of the luminance signal.

16. An apparatus for intra-predicting an image, the apparatus comprising:

a parameter obtainer configured to obtain, based on restored neighboring pixels of a chrominance block and restored neighboring pixels of a luminance pixel corresponding to the chrominance block, parameters representing a correlation between the chrominance block that is to be intra-predicted and a luminance block; and a prediction performer configured to predict, using the parameters, the chrominance block from the luminance block, wherein the parameter obtainer configured to perform a predetermined operation on the restored neighboring pixels of the chrominance block and the restored neighboring pixels of the luminance block, and wherein the predetermined operation comprises an adaptive scaling process of changing bit depths of the parameters.

17. A non-transitory computer-readable recording medium having recorded thereon a program for executing the method of claim 1.

* * * * *